United States Patent
Mincher et al.

(10) Patent No.: US 10,282,697 B1
(45) Date of Patent: May 7, 2019

(54) SPATIALLY AWARE MOUNTING SYSTEM

(71) Applicant: AMAZON TECHNOLOGIES, INC., Seattle, WA (US)

(72) Inventors: Richard William Mincher, Cupertino, CA (US); Arvind Thiagarajan, Cambridge, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 796 days.

(21) Appl. No.: 14/501,395

(22) Filed: Sep. 30, 2014

(51) Int. Cl.
*G06Q 10/08* (2012.01)
*G01B 21/00* (2006.01)

(52) U.S. Cl.
CPC .......... *G06Q 10/087* (2013.01); *G01B 21/00* (2013.01)

(58) Field of Classification Search
CPC .............................. G06Q 10/087; G01B 21/00
USPC ........................................................ 235/385
See application file for complete search history.

(56) References Cited

U.S. PATENT DOCUMENTS

| | | | |
|---|---|---|---|
| 7,225,980 B2 | 6/2007 | Ku et al. | |
| 7,949,568 B2 | 5/2011 | Fano et al. | |
| 8,009,864 B2 | 8/2011 | Linaker et al. | |
| 8,189,855 B2 | 5/2012 | Opalach et al. | |
| 8,630,924 B2 | 1/2014 | Groenevelt et al. | |
| 9,235,928 B2 | 1/2016 | Medioni et al. | |
| 9,411,457 B2 | 8/2016 | Perlin et al. | |
| 9,524,020 B2 | 12/2016 | Perlin et al. | |
| 2011/0011936 A1 | 1/2011 | Morandi et al. | |
| 2012/0086553 A1* | 4/2012 | Wilkinson | G06K 19/07749 340/10.1 |
| 2012/0089348 A1* | 4/2012 | Perlin | G06F 3/005 702/41 |
| 2012/0284132 A1 | 11/2012 | Kim et al. | |
| 2013/0284806 A1 | 10/2013 | Margalit | |
| 2013/0319137 A1* | 12/2013 | Grau | G06F 3/005 73/862.381 |

(Continued)

OTHER PUBLICATIONS

Asthana, et al., "An indoor wireless system for personalized shopping assistance", CiteSeerX, In Proceedings of IEEE Workshop on Mobile Computing Systems and Applications, 1994; [retrieved on Jun. 30, 2013]. Retrieved from the Internet: <URL:http://citeseerx.ist.psu.edu/viewdoc/summary?doi=10.1.1.127.3033>.

(Continued)

*Primary Examiner* — Toan Ly
(74) *Attorney, Agent, or Firm* — Lindauer Law, PLLC

(57) ABSTRACT

Knowing a location of a sensor or other device may be useful in a variety of settings. Described herein are devices and techniques for using modular sections of known dimensions that are configured to couple to one another at predetermined coupling positions. The modular sections may intercommunicate to provide data identifying adjacent modular sections, the respective coupling positions, and where on each of the modular sections a device is attached. By analyzing this data, two- or three-dimensional arrangement data of the modular sections and devices may be generated. Using information about the physical dimensions of the modular sections, spatial coordinates indicative of where the devices are located in space may be determined. As devices or modular sections are added, removed, or replaced, the arrangement and the corresponding spatial coordinates may be updated to reflect the changes.

20 Claims, 11 Drawing Sheets

(56) References Cited

U.S. PATENT DOCUMENTS

2015/0301781 A1* 10/2015 Ekkaia ................ G06F 3/1446
362/237

OTHER PUBLICATIONS

Kalnikaite, et al., "How to Nudge In Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011. Retrieved from Internet: <URL:http://www.researchgate.net/publication/221568350_How_to_nudge_in_Situ_designing_lalambent_devices_to_deliver_salient_information_in_supermarkets>.

Pop, Christian, "Introduction to the BodyCom Technology", AN1391, DS01391A, Microchip Technology, Inc., May 2, 2011.

* cited by examiner

SPATIALLY AWARE MOUNTING SYSTEM

BACKGROUND

Places such as warehouses, retail stores, homes, and so forth, may be outfitted with a variety of devices such as sensors, emitters, and so forth. For example, an e-commerce website may maintain inventory of various items that may be ordered, purchased, leased, borrowed, rented, viewed, and so forth, by clients or customers in a fulfillment center. When a customer orders an item, the item is picked from inventory, routed to a packing station, packed, and shipped to the customer. Likewise, physical stores maintain inventory in customer accessible areas (e.g., shopping area), and customers can pick items from inventory and take them to a cashier for purchase, rental, and so forth. Many of the physical stores also maintain inventory in a storage area, fulfillment center, or other facility that can be used to replenish inventory located in the customer accessible areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor the movement of inventory, users, and other objects within the facility. This monitoring may be provided using devices such as emitters, sensors, and so forth. Knowledge of where these devices are located in space may be needed to monitor the movement or perform other functions using the devices.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
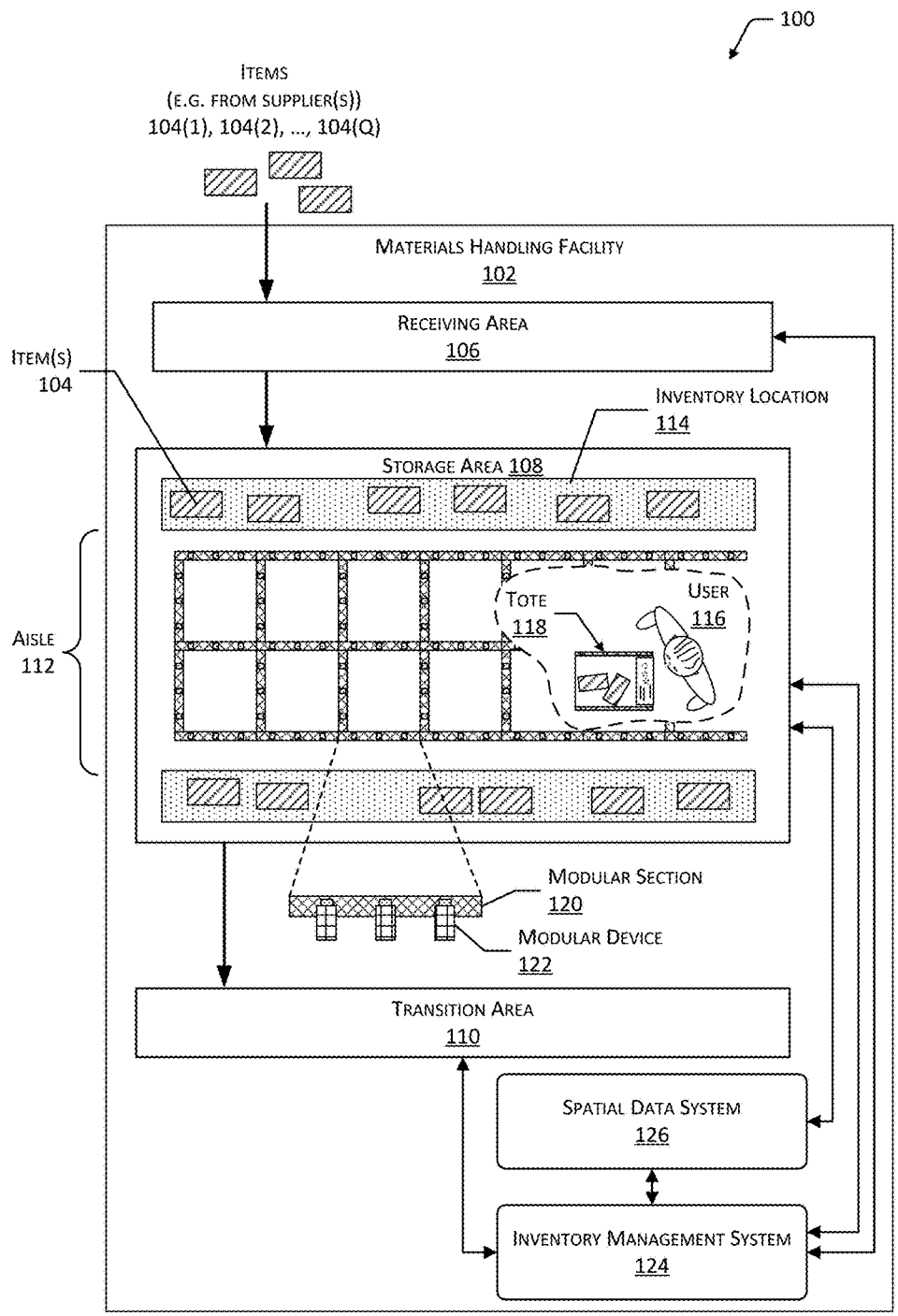
FIG. 1 is a block diagram illustrating a materials handling facility having a spatially aware mounting system, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques for implementing a spatially aware mounting system that may be used in a materials handling facility (facility) or other setting. The facility may include, or have access to, an inventory management system. The inventory management system may be configured to maintain information about items, users, condition of the facility, and so forth. For example, the inventory management system may maintain data indicative of what items a particular user has ordered to pick, location of the particular user, availability of a user providing support services to others, requests for assistance, environmental status of the facility, and so forth. Operation of the facility may be facilitated by using one or more modular devices such as emitters, sensors, lights, and so forth. In some implementations, location of the modular devices in space may be important for operation of the facility. For example, an ultrasonic tracking system may need ultrasonic emitters or sensors emplaced in a regular pattern at known intervals, know the location of those emitters or sensors, and so forth.

A spatially aware mounting system comprises a plurality of modular sections that may be coupled with one another. The modular sections may include sockets configured to couple to the modular devices. Geometric data, such as shape and physical dimensions, of the modular sections are known. The modular sections, when interconnected, provide a relatively fixed framework to which the modular devices may couple by way of the sockets. When affixed, the modular devices are thus in a particular socket on a particular modular section.

The modular sections may be configured to exchange information with one another or with another device such as a server or controller. The information may include digest data that provides details about which modular sections are connected to which neighboring modular sections ("neighbors"), relative position of those neighbors, what modular devices are installed and in which sockets, and so forth.

A spatial data system may generate arrangement data. The arrangement data provides information indicative of relative positions of the modular sections and the sockets thereon. For example, the arrangement data may indicate that one modular section is connected to another. The spatial data system may access geometric data providing information indicative of the physicality of the modular section, such as shape, physical dimensions, positioning of sockets, and so forth. By processing the arrangement data with the actual physical dimensions in the geometric data, spatial coordinates for one or more points of the modular section may be generated. The spatial coordinates may be expressed with respect to a "relative origin" such as a particular modular section within an array of the modular sections.

A coordinate transform module may generate an offset vector indicative of a displacement between the relative spatial coordinates and another "external" set of spatial coordinates using a different origin. The offset vector may then be used to convert between the "relative spatial coordinates" that are expressed with regard to the relative origin and the "external spatial coordinates" that are expressed with regard to an external origin.

The spatial coordinates or other information indicative of placement of the modular devices within an environment may be used by other systems. For example, the inventory management system may use the spatial coordinates to determine the placement of sensors used to track objects within the facility.

By using the spatially aware mounting system, generation of the spatial coordinates may be performed automatically with little or no user intervention. Instead of time consuming and error-prone manual measurement, spatial coordinates for the modular section or the modular device coupled to a socket may be quickly and accurately determined.

The physical configuration of the spatially aware mounting system may undergo change, such as coupling or uncoupling of modular sections, addition or removal of modular devices, and so forth. By using the devices and techniques described herein, accurate information about how the modular sections and modular devices are located in space may be maintained. For example, should a modular device be installed, or a new string of modular sections added, such information may be quickly generated and provided for use by the inventory management system. As a result, overall installation and ongoing maintenance costs may be reduced, the installation process may be simplified, and the modular devices may support functionality beneficial to users of the facility.

As used herein, a facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. The systems and techniques described in this disclosure may also be used in other settings. For example, the spatially aware mounting system may be used in residences, businesses, data centers, construction sites, factories, public venues, stadiums, sporting facilities, medical facilities, and so forth.

Illustrative System

An implementation of a materials handling system 100 configured to store and manage inventory items is illustrated in FIG. 1. A materials handling facility 102 (facility) comprises one or more physical structures or areas within which one or more items 104(1), 104(2), . . . , 104(Q) may be held. As used in this disclosure, letters in parenthesis such as "(Q)" indicate an integer value. The items 104 comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114 may include one or more of shelves, racks, cases, cabinets, bins, floor locations, or other suitable storage mechanisms for holding, supporting, or storing the items 104. The inventory locations 114 may be affixed to the floor or another portion of the facility's structure, or the inventory locations 114 may be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one location within the facility 102 to another.

One or more users 116(1), 116(2), . . . , 116(U) and totes 118(1), 118(2), 118, . . . , 118(T) or other material handling apparatus may move within the facility 102. For example, the user 116 may move about within the facility 102 to pick or place the items 104 in various inventory locations 114, placing them on the tote 118 for ease of transport. The totes 118 may include carts, baskets, and so forth. In other implementations, other devices such as robots, forklifts, cranes, aerial drones, and so forth, may move about the facility 102 picking, placing, or otherwise moving the items 104.

A plurality of modular sections 120 may be deployed in the facility 102. The modular sections 120 are configured to couple to one another and provide coupling mechanisms for one or more modular devices 122. The coupling mechanism between the modular section 120 and the modular device 122 may comprise a socket. The socket may support mechanical coupling, electrical coupling, coupling of a data transmission medium, and so forth. The modular sections 120 are configured to couple to other modular sections 120 as well. In some implementations, the modular sections 120 may include spacers or other elements that omit the socket. The modular sections 120 may be configured to exchange information with one another, and the modular sections 120 may be mounted on or within a floor, wall, at or suspend from a ceiling, at an inventory location 114, and so forth. The modular sections 120 are discussed in more detail below with regard to FIG. 3.

The modular devices 122 may include, but are not limited to, emitters, sensors, lights, output devices used to present information to users, and so forth. The output devices, emitters, sensors, and so forth, are described in more detail below with regard to FIG. 2.

While the storage area 108 is depicted as having one or more aisles 112, inventory locations 114 storing the items 104, modular sections 120, and so forth, it is understood that the receiving area 106, the transition area 110, or other areas of the facility 102 may be similarly equipped. Furthermore, the arrangement of the various areas within the facility 102 is depicted functionally rather than schematically. For example, in some implementations, multiple different receiving areas 106, storage areas 108, and transition areas 110 may be interspersed rather than segregated.

The facility 102 may include, or be coupled to, an inventory management system 124. The inventory management system 124 is configured to interact with users 116 or devices such as modular devices 122, robots, material handling equipment, computing devices, and so forth, in one or more of the receiving area 106, the storage area 108, or the transition area 110. For example, the inventory management system 124 may be configured to track objects within the facility 102, including, but not limited to, the items 104, users 116, the totes 118, and so forth.

The inventory management system 124 may be configured to use the modular devices 122 during operation. For example, the modular devices 122 may comprise sensors configured to provide sensor data to the inventory management system 124 for tracking items 104. In another example, the modular devices 122 may comprise emitters configured to generate signals as directed by the inventory management system to operate the facility 102. Information about the location in space within the facility 102 of the modular sections 120, the modular devices 122, or portions thereof, may be used by the inventory management system 124 during operation. For example, the spatial arrangement of the modular devices 122 may be used to implement beamforming of signals received or emitted by the modular device 122. The location information may be obtained from a spatial data system 126.

The spatial data system 126 may be configured to generate information indicative of a location of one or more of the modular section 120, the modular device 122, or portions thereof. This information may be provided to one or more of the modular sections 120, the modular devices 122, or another system or device. For example, the spatial data system 126 may provide location information such as spatial coordinates to the modular devices 122. The modular devices 122 may then provide the spatial coordinates to the inventory management system 124. In another example, the spatial data system 126 may provide the information to the inventory management system 124.

The location provided by the spatial data system 126 may be specified in terms of spatial coordinates, such as distances along one or more axes relative to an origin point. The inventory management system 124 may use the information provided by the spatial data system 126 to facilitate operation. For example, the modular devices 122 may form an array of beacons configured to emit signals used for tracking an object. During operation, the location in three-dimensional space of each beacon modular device 122 in the array may need to be known. The spatial data system 126 may be configured to provide spatial coordinates for each of the beacon modular devices 122 to the inventory management module 124. Continuing the example, given the known spatial coordinates of each beacon, the inventory management system 124 may use sensor data from a sensor onboard the tote 118 that detects the signals emitted by the beacon to determine the location of the tote 118 within the facility.

In some implementations at least a portion of the functionality of the spatial data system 126 may be distributed throughout the modular sections 120. For example, at least some of the modular sections 120 may incorporate processors configured to determine location information based at least in part on the relative coupling of other modular sections 120. In other implementations, the spatial data system 126 may comprise a separate device, such as a server.

The facility 102 may be configured to receive different kinds of items 104 from various suppliers, and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of thing, depending on the nature of the enterprise that operates the facility 102.

Upon being received from a supplier at the receiving area 106, the items 104 may be prepared for storage in the storage area 108. For example, in some implementations, items 104 may be unpacked or otherwise rearranged. The inventory management system 124 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable units, individual units, or multiple units, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108, and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 where items 104 are transitioned from one location to another, or from one entity to another. For example, the transition area 110 may be a packing station within the facility 102. When the item 104 arrives at the transition area 110, the item 104 may be transitioned from the storage area 108 to the packing station at the transition area 110. Information about the transition may be maintained by the inventory management system 124.

In another example, if the items 104 are departing the facility 102, a list of the items 104 may be obtained and used by the inventory management system 124 to transition responsibility for, or custody of, the items 104 from the facility 102 to another entity. For example, a carrier may accept the items 104 for transport with the carrier accepting responsibility for the items 104 indicated in the list. In another example, a user 116 may purchase or rent the items 104 and remove the items 104 from the facility 102.

During use of the facility 102, the user 116 may move about the facility 102 to perform various tasks, such as picking or placing the items 104 in the inventory locations 114. The user 116 may benefit from operation of the modular devices 122. For example, a pick list may be presented to the user 116 for items 104 in inventory locations 114 proximate to the location of the user 116 as determined using sensor data obtained by a modular device 122 that incorporates one or more sensors.

Other benefits may also accrue from the use of the modular sections 120 and the modular devices 122. For example, installation of the modular sections 120 and the modular devices 122 may provide lower labor costs than traditional installation involving manual placement and location mapping of devices such as sensors, emitters, and so forth. Furthermore, ongoing labor to maintain the system may be less than that of conventional installations, as defective or inoperable elements, such as the modular sections 120 or the modular devices 122, may be easily removed and replaced with replacements. The improved ease of maintenance may also mitigate failures and improve uptime, further enhancing the experience of the user 116.

Figure 2:
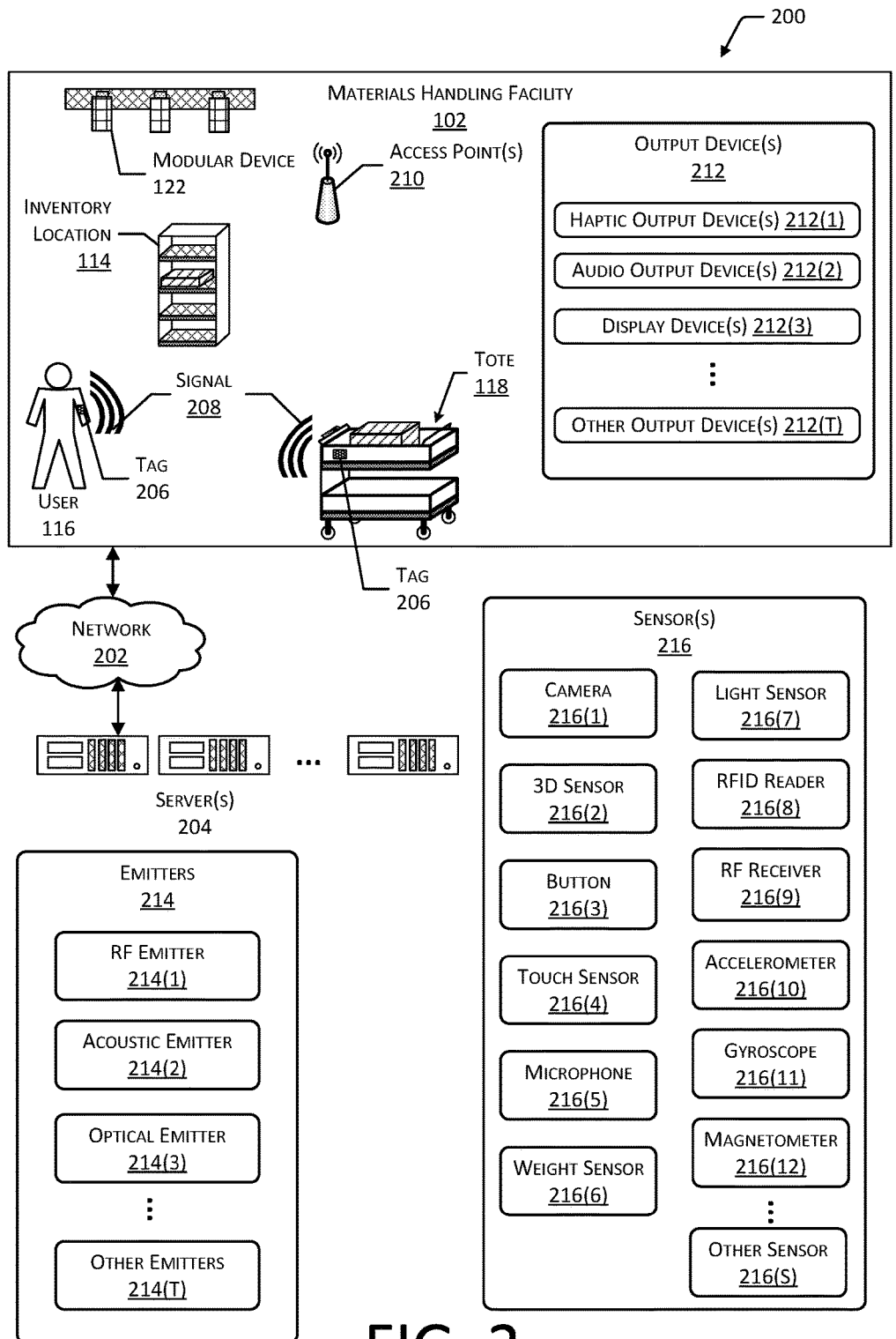
FIG. 2 is a block diagram illustrating additional details of the materials handling facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks, public networks such as the Internet, or a combination thereof. The network 202 may utilize wired technologies (e.g., wires, fiber optic cable, and so forth), wireless technologies (e.g., radio frequency, infrared, acoustic, optical, and so forth), or other connection technologies. The network 202 is representative of any type of communication network, including one or more of data networks or voice networks. The network 202 may be implemented using wired infrastructure (e.g., copper cable, fiber optic cable, and so forth), a wireless infrastructure (e.g., cellular, microwave, satellite, and so forth), or other connection technologies.

The servers 204 may be configured to execute one or more modules or software applications associated with the inventory management system 124, the spatial data system 126, and so forth. While the servers 204 are illustrated as being in a location outside of the facility 102, in other implementations, at least a portion of the servers 204 may be located at the facility 102. The servers 204 are discussed in more detail below with regard to FIG. 8.

The users 116, the totes 118, or other objects in the facility 102 may be equipped with one or more RF tags 206. The tags 206 are configured to emit a signal 208. In one implementation, the tag 206 may be a radio frequency identification (RFID) tag configured to emit an RF signal 208 upon activation by an external signal. For example, the external signal may comprise a radio frequency signal or a magnetic field configured to energize or activate the RFID tag. In another implementation, the tag 206 may comprise a transmitter and a power source configured to power the transmitter. For example, the tag 206 may comprise a Bluetooth Low Energy (BLE) transmitter and battery. In other implementations, the tag may use other techniques to indicate presence of the tag. For example, an acoustic tag may be configured to generate an ultrasonic signal which is detected by corresponding acoustic receivers. In yet another implementation, the tag may be configured to emit an optical signal.

The inventory management system 124 may be configured to use the tags 206 for one or more of identification of an object, determining a location of the object, and so forth. For example, the users 116 may wear tags 206, the totes 118 may have tags 206 affixed, and so forth, which may be read and, based at least in part on signal strength, used to determine identity and location. The tote 118 is configured to carry or otherwise transport one or more items 104. For example, the tote 118 may include a basket, a cart, a bag, and so forth.

Generally, the inventory management system 124 or other systems associated with the facility 102 may include any number and combination of input components, output components, and servers 204. For example, the spatial data system 126 may use an array of emitters, sensors, and so forth, as described below.

The facility 102 may include one or more access points 210 configured to establish one or more wireless networks. The access points 210 may use Wi-Fi, near field communication (NFC), Bluetooth, or other technologies to establish wireless communications between a device and the network 202. The wireless networks may allow the devices to communicate with the inventory management system 124, the spatial data system 126, the tags 206, a communication device of the tote 118, or other devices.

Output devices 212 may also be provided in the facility 102. The output devices 212 are configured to generate signals which may be perceived by the user 116. Haptic output devices 212(1) are configured to provide a signal, which results in a tactile sensation to the user 116. The haptic output devices 212(1) may use one or more mechanisms, such as electrical stimulation or mechanical displacement, to provide the signal. For example, the haptic output devices 212(1) may be configured to generate a modulated electrical signal, which produces an apparent tactile sensation in one or more fingers of the user 116. In another example, the haptic output devices 212(1) may comprise piezoelectric or rotary motor devices configured to provide a vibration that may be felt by the user 116.

One or more audio output devices 212(2) are configured to provide acoustic output. The acoustic output includes one or more of infrasonic sound, audible sound, or ultrasonic sound. The audio output devices 212(2) may use one or more mechanisms to generate the acoustic output. These mechanisms may include, but are not limited to, the following: voice coils, piezoelectric elements, magnetorestrictive elements, electrostatic elements, and so forth. For example, a piezoelectric buzzer or a speaker may be used to provide acoustic output.

The display devices 212(3) may be configured to provide output which may be seen by the user 116 or detected by a light-sensitive detector such as a camera or light sensor. The output may be monochrome or color. The display devices 212(3) may be emissive, reflective, or both emissive and reflective. An emissive display device 212(3), such as using light emitting diodes (LEDs), is configured to emit light during operation. In comparison, a reflective display device 212(3), such as using an electrophoretic element, relies on ambient light to present an image. Backlights or front lights may be used to illuminate non-emissive display devices 212(3) to provide visibility of the output in conditions where the ambient light levels are low.

The display mechanisms of the display devices 212(3) may include, but are not limited to, micro-electromechanical systems (MEMS), spatial light modulators, electroluminescent displays, quantum dot displays, liquid crystal on silicon (LCOS) displays, cholesteric displays, interferometric displays, liquid crystal displays, electrophoretic displays, and so forth. These mechanisms are configured to emit light, modulate incident light emitted from another source, or both. The display devices 212(3) may operate as panels, projectors, and so forth.

The display devices 212(3) may be configured to present images. For example, the display devices 212(3) may comprise a pixel-addressable display. The image may comprise at least a two-dimensional array of pixels. The image may also comprise a vector representation of an at least two-dimensional image.

In some implementations, the display devices 212(3) may be configured to provide non-image data, such as text characters, colors, and so forth. For example, a segmented electrophoretic display device 212(3), segmented LED, and so forth, may be used to present information such as an item number. The display devices 212(3) may also be configurable to vary the color of the segment, such as using multicolor LED segments.

The display devices 212(3) may be configurable to provide image or non-image output. For example, an electrophoretic display device 212(3) with addressable pixels may be used to present images of text information, or all of the pixels may be set to a solid color such as in a first state that is solid black or a second state that is solid white.

Other output devices 212(T) may also be present. For example, the other output devices 212(T) may include scent/odor dispensers, document printers, three-dimensional printers or fabrication equipment, and so forth.

One or more emitters 214 configured to generate a signal may be arranged within the facility 102. In some implementations, the modular device 122 may comprise one or more emitters 214. The emitters 214 are configured to generate signals. These signals may be radio frequency, acoustic, optical, magnetic, vibrational, and so forth. For example, emitters 214 may be used to generate electromagnetic or acoustic signals that may be used to provide location data of an object within the facility 102. An RF emitter 214(1) is configured to generate RF signals 208. For example, the RF emitter 214(1) may be used to emit radar signals. In another implementation, the RF emitter 214(1) may be configured to interrogate or energize the tags 206.

An acoustic emitter 214(2) is configured to generate acoustic output. The acoustic output may include one or more of infrasonic sound, audible sound, or ultrasonic sound. The acoustic emitter 214(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output.

An optical emitter 214(3) is configured to generate optical output. The optical output may comprise wavelengths such as infrared, visible, ultraviolet, and so forth. The optical emitter 214(3) may comprise an LED, laser, quantum dot, and so forth.

Other emitters 214(T) may be used. For example, a terahertz emitter may generate terahertz wavelengths. In some implementations, the emitters 214 may perform multiple functions. For example, the acoustic emitter 214(2) may be configured to provide ultrasonic signals for use in echolocation of an object as well as audible signals such as audio prompts to the user 116.

One or more sensors 216 configured to detect a signal may be arranged at one or more locations within the facility 102. For example, the sensors 216 may be mounted on or within a floor, a wall, a ceiling, at an inventory location 114, on the tote 118, carried or worn by the user 116, and so forth. In some implementations, the modular device 122 may include one or more sensors 216.

The sensors 216 may include one or more cameras 216(1). The cameras 216(1) may include imaging sensors configured to acquire images of a scene. The imaging sensors are configured to detect light in one or more wavelengths including, but not limited to, terahertz, infrared, visible, ultraviolet, and so forth. The imaging sensors may comprise charge coupled devices (CCD), complementary metal oxide semiconductor (CMOS) devices, microbolometers, and so forth. The inventory management system 124 may use image data acquired by the cameras 216(1) during operation of the facility 102. For example, the inventory management system 124 may identify items 104, users 116, totes 118, and so forth, based at least in part on their appearance within the image data acquired by the cameras 216(1). The cameras 216(1) may be mounted in various locations within the facility 102. For example, cameras 216(1) may be mounted overhead, on inventory locations 114, attached to the modular sections 120, and so forth. In another example, the cameras 216(1) may be worn or carried by users 116, affixed to totes 118, and so forth.

One or more 3D sensors 216(2) may also be included in the sensors 216. The 3D sensors 216(2) are configured to acquire spatial or three-dimensional data, such as depth information, about objects within a field-of-view of a sensor 216. The 3D sensors 216(2) include range cameras, lidar systems, sonar systems, radar systems, structured light systems, stereo vision systems, optical interferometry systems, and so forth.

One or more buttons 216(3) are configured to accept input from the user 116. The buttons 216(3) may comprise mechanical, capacitive, optical, or other mechanisms. For example, the buttons 216(3) may comprise mechanical switches configured to accept an applied force from a touch of the user 116 to generate an input signal. The inventory management system 124 may use data from the buttons 216(3) to receive information from the user 116. For example, the tote 118 may be configured with a button 216(3) to accept input from the user 116 and send information indicative of the input to the inventory management system 124.

The sensors 216 may include one or more touch sensors 216(4). The touch sensors 216(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 124 may use data from the touch sensors 216(4) to receive information from the user 116. For example, the touch sensor 216(4) may be integrated with the inventory location 114 or tote 118 to provide a touchscreen with which the user 116 may select one or more particular items 104 from a menu for picking.

One or more microphones 216(5) may be configured to acquire information indicative of sound present in the environment. In some implementations, the modular devices 122 may comprise microphones 216(5). The modular devices 122 may be coupled to the modular sections 120 to form an array. The physical configuration of the array, such as locations of the modular devices 122, two- or three-dimensional spatial coordinates, and so forth, may be determined by the spatial data system 126. By using information about the location of the microphones 216(5) in the modular devices 122, various processing techniques such as beamforming, triangulation, and so forth, may be applied to received signals. The inventory management system 124 may use the one or more microphones 216(5) to acquire information from acoustic tags, accept voice input from the users 116, determine the location of an object in the facility 102, determine ambient noise level, and so forth.

One or more weight sensors 216(6) are configured to measure the weight of a load, such as the item 104, the user 116, the tote 118, and so forth. The weight sensors 216(6) may be configured to measure the weight of the load at one or more of the inventory locations 114, the tote 118, or on the floor of the facility 102. The weight sensors 216(6) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 216(6) may operate as transducers that generate one or more signals based on an applied force, such as that of the load due to gravity. The inventory management system 124 may use the data acquired by the weight sensors 216(6) to identify an object, determine a location of an object, maintain shipping records, identify the user 116, and so forth.

The sensors 216 may include one or more light sensors 216(7). The light sensors 216(7) may be configured to provide information associated with ambient lighting conditions such as a level of illumination. Information acquired by the light sensors 216(7) may be used by the inventory management system 124. For example, the intensity of illumination provided by optical emitters 214(3) may be adjusted, responsive to the level of lighting present in the facility 102.

One more radio frequency identification (RFID) readers 216(8), near field communication (NFC) systems, and so forth, may also be included as sensors 216. For example, the RFID readers 216(8) may be configured to read the tags 206. Information acquired by the RFID reader 216(8) may be used by the inventory management system 124 to identify an object associated with the tag 206 such as the item 104, the user 116, the tote 118, and so forth. For example, based on information from the RFID readers 216(8) detecting the tag 206 at different times and different RFID readers 216(8) having locations in the facility 102, a velocity of the tag 206 may be determined.

One or more RF receivers 216(9) may also be included as sensors 216. In some implementations, the RF receivers 216(9) may be part of transceiver assemblies. The RF receivers 216(9) may be configured to acquire signals 208 associated with Wi-Fi, Bluetooth, ZigBee, 3G, 4G, LTE, or other wireless data transmission technologies. The RF receivers 216(9) may provide information associated with data transmitted via radio frequencies, signal strength of RF signals 208, and so forth. For example, information from the RF receivers 216(9) may be used by the inventory management system 124 to determine a location of an RF source, such as a communication interface onboard the tote 118 or carried by the user 116.

The sensors 216 may include one or more accelerometers 216(10), which may be worn or carried by the user 116, mounted to the tote 118, and so forth. The accelerometers 216(10) may provide information such as the direction and magnitude of an imposed acceleration. Data such as rate of acceleration, determination of changes in direction, speed, and so forth, may be determined using the accelerometers 216(10).

A gyroscope 216(11) provides information indicative of rotation of an object affixed thereto. For example, the tote 118 or other objects may be equipped with a gyroscope 216(11) to provide data indicative of a change in orientation.

A magnetometer 216(12) may be used to determine an orientation by measuring ambient magnetic fields, such as the terrestrial magnetic field. The magnetometer 216(12) may be worn or carried by the user 116, mounted to the tote 118, and so forth. For example, the magnetometer 216(12) mounted to the tote 118 may act as a compass and provide information indicative of which direction the tote 118 is oriented.

The sensors 216 may include other sensors 216(S) as well. For example, the other sensors 216(S) may include proximity sensors, ultrasonic rangefinders, thermometers, barometric sensors, hygrometers, or biometric input devices including, but not limited to, fingerprint readers or palm scanners. For example, the inventory management system 124 may use information acquired from thermometers and hygrometers in the facility 102 to direct the user 116 to check on delicate items 104 stored in a particular inventory location 114, which is overheating, too dry, too damp, and so forth.

In some implementations, the camera 216(1) or other sensors 216(S) may include hardware processors, memory, and other elements configured to perform various functions. For example, the cameras 216(1) may be configured to generate image data, send the image data to another device such as the server 204, and so forth.

The spatial data system 126 may provide information about the location of the modular sections 120, the modular devices 122 coupled to the modular sections 120, or both to the inventory management system 124. The inventory management system 124 may use the information, such as spatial coordinates, to process data received from the sensors 216. For example, given a known location in space of two cameras 216(1) that are positioned at known positions on particular modular sections 120, the inventory management system 124 may use stereo vision techniques to determine a location of an object within the field of view of the cameras 216(1).

Figure 3:
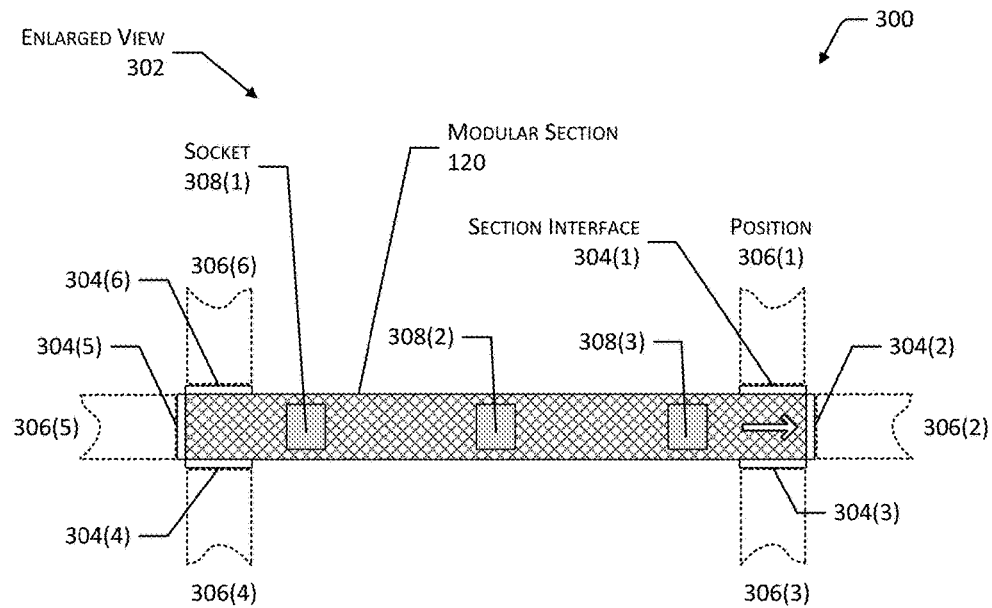
FIG. 3 illustrates a modular section and an example arrangement, according to some implementations.
Figure 3:
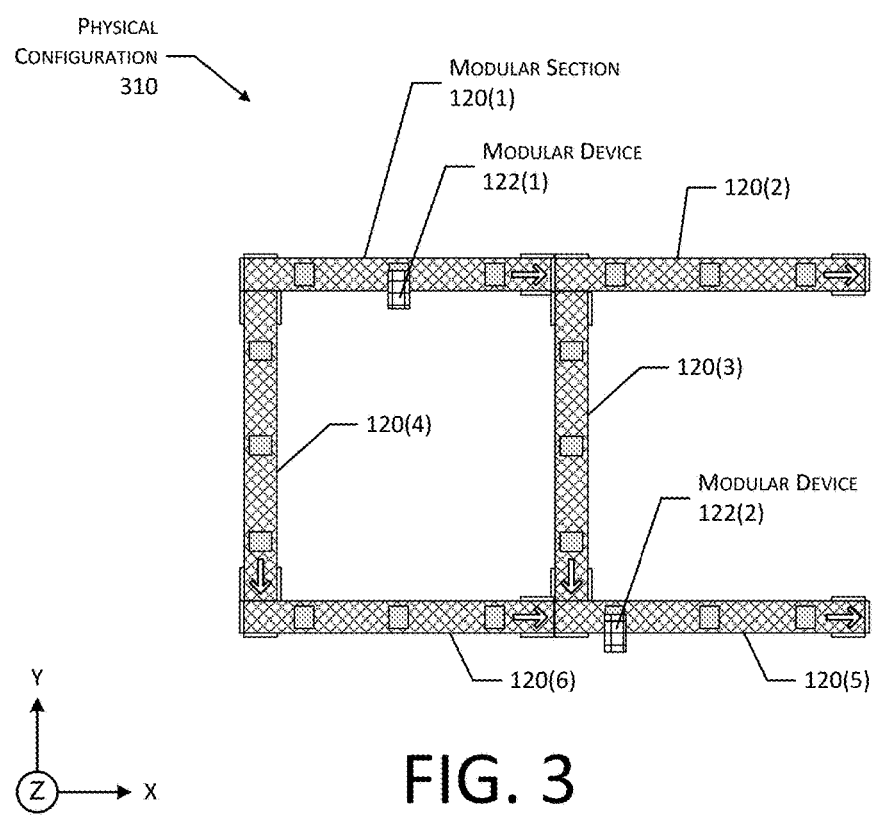

FIG. 3 provides an illustration 300 of the modular section 120 and an example arrangement, according to some implementations. In this illustration, an enlarged view 302 depicts a modular section 120. The modular section 120 is depicted as a "strip" or linear element. In other implementations, the modular section 120 may have other shapes such as a right angle, T, cross, and so forth. For example, the modular section 120 may comprise a hexagon or other space-filling polyhedral. The modular section 120 may include a chassis, frame, or other structure configured to maintain the overall shape during operation. For example, the modular section 120 may comprise plastic, ceramics, composite materials, metal, wood, and so forth.

The modular section 120 may have one or more section interfaces 304. The section interfaces 304 are configured such that the modular section 120 may couple with a section interface 304 of another "neighbor" modular section 120. The section interface 304 may comprise one or more mechanical couplings, one or more electrical couplings, one or more optical couplings, and so forth. For example, the section interface 304 may comprise structures such as tabs, slots, cams, threads, and so forth, configured to engage corresponding structures on a neighbor modular section 120. In some implementations, the section interface 304 may comprise a single connector providing mechanical, electrical, optical, or other interconnects. For example, the section interface 304 may comprise a connector configured to simultaneously provide a mechanical and electrical interface. In other implementations, the section interface 304 may comprise multiple connectors, jumpers, or other mechanisms configured to couple modular sections 120.

The section interface 304 may include or be serviced by one or more sensors 216 or devices configured to determine that the section interface 304 is coupled to another section interface 304 or other device. In some implementations, a change in an electrical signal may be used to indicate the section interface 304 is coupled to another section interface 304 or other device. For example, the section interface 304 may include a switch configured to make or break a contact upon mechanical engagement of the section interface 304 with a corresponding member. In another example, the section interface 304 may include electrical contacts, such as on opposing sides of the same section interface 304 connector. Continuing the example, the engaging member of the section interface 304 of the neighbor modular section 120 may be electrically conductive, providing an electrical pathway between the electrical contacts. In yet another example, the section interface 304 may utilize proximity or other sensors 216 such as optical proximity sensors, capacitive proximity sensors, and so forth, to determine the presence of the neighboring modular section 120 at the section interface 304.

The section interfaces 304 are depicted as occurring within a single plane (X-Y) for ease of illustration and not by way of a limitation. For example, section interfaces 304 may be provided that extend along the Z axis that is orthogonal to the X-Y plane. Each section interface 304 is associated with a particular position 306 relative to the modular section 120. In this illustration, the modular section 120 includes six section interfaces 304(1), 304(2), . . . , 304(6), having corresponding positions 306(1), 306(2), . . . , 306(6). For example, the position 306(1) corresponds to the section interface 304(1) that extends at a right angle relative to a long access of the modular section 120. The position 306 expresses a relative physical configuration of a neighbor modular section 120 with respect to an originating modular section 120. For example, the physical configuration may indicate that one modular section 120 is attached at a right-angle to another modular section 120.

The modular section 120 may include one or more sockets 308. The socket 308 is configured to couple to one or more modular devices 122. The socket 308 may comprise one or more mechanical couplings, one or more electrical couplings, one or more optical couplings, and so forth. For example, the socket 308 may comprise a mechanical connector configured to retain the modular device 122 and one or more electrical conductors configured to deliver power, communications, and so forth. In this illustration, the modular section 120 includes three sockets 308(1), 308(2), and 308(3). The socket 308 may be configured to provide a change in an electrical signal to indicate that the modular device 122 is coupled to the socket 308.

Arrangement of the socket 308 on the modular section 120 is predetermined or may be determinable. For example, the socket 308 may comprise a fixed plug at a predetermined point on the modular section 120, into which the modular device 122 may couple. In another example, the socket 308 may comprise a movable plug and a linear encoder, or other mechanism, configured to provide information as to the location of the socket 308 with respect to the modular section 120.

In another implementation, the section interface 304 and socket 308 may comprise the same or similar connectors. For example, a modular section 120 may be coupled to a socket 308, or a modular device 122 may be coupled to a section interface 304.

An example of a relative physical configuration 310 is depicted. The physical configuration 310 may provide information indicative of how the modular sections 120 are coupled together relative to one another. The physical configuration is relative in that the dimensionality of the modular sections 120 may not be known, the location of the modular sections 120 in real three-dimensional space may not be known, and so forth. However, the physical configuration 310 does provide information about which modular sections 120 are coupled to one another, and in which position 306.

The example physical configuration 310 depicted in FIG. 3 shows the modular sections 120(1), 120(2), . . . , 120(6) in a planar structure. Attached to the socket 308(2) of the modular section 120(1) is the modular device 122(1). Attached to the socket 308(1) of the modular section 120(5) is the modular device 122(2). When coupled together, the modular sections 120 provide a relatively rigid framework for baseline to which the modular devices 122 are coupled. As a result, the relative position or arrangement in space between modular devices 122 remain known and constant so long as they are coupled to the modular section 120.

In one implementation the modular section 120 may comprise one or more moveable or reconfigurable sections. For example, the modular section 120 may comprise one or more rotatable joints. The modular section 120 may be configured with sensors 120 configured to provide data indicative of the physical configuration of portions of the modular section 120 relative to one another.

During installation, an installing user may couple together a plurality of modular sections 120. As described above, the modular sections 120 may be provided in a plurality of shapes or may have different dimensions. For example, some modular sections 120 may be longer or shorter than others. The modular sections 120 may be arranged as necessary around architectural elements such as beams or columns. The modular sections 120 may also be arranged to satisfy particular design requirements with regard to the modular devices 122 to be used and so forth.

After installation, modular sections 120, modular devices 122, or both modular sections 120 and modular device 122 may be selectively removed from the overall system. For example, should the modular section 120(3) need to be replaced, it may be removed from the overall assembly and replaced with a new modular section 120. In a similar fashion, the modular devices 122 may be added or removed to the sockets 308 on a modular section 120.

The spatial data system 126 may be configured to generate information about the physical configuration and location in space of one or more of the modular sections 120, the modular devices 122, or portions thereof. The information may be generated at time of installation or during ongoing usage. For example, the spatial data system 126 may be configured to detect and provide information about the addition of a new modular section 120 or a removal of an existing modular device 122. The information may be provided to the inventory management system 124 for use in operation of the facility 102.

Figure 4:
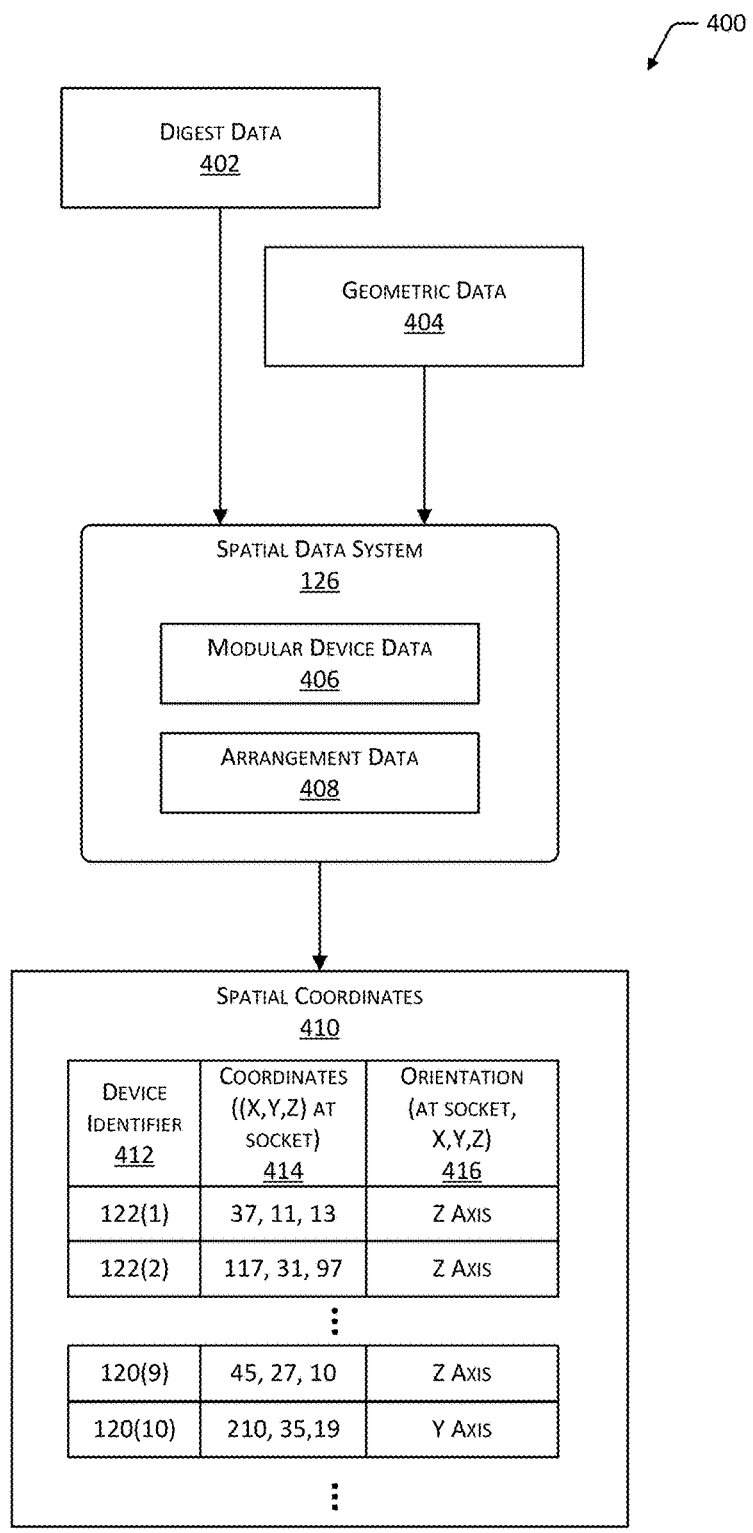
FIG. 4 illustrates a block diagram of inputs to a spatial data system and spatial coordinates provided as an output.

FIG. 4 illustrates a block diagram 400 of inputs to the spatial data system 126 and resulting output. The spatial data system 126 may be configured to accept digest data 402 and geometric data 404. The digest data 402 may comprise information about the modular section 120, the neighbor modular sections 120 coupled thereto, modular devices 122 coupled thereto, and so forth. The digest data 402 is described in more detail below with regard to FIG. 5. The geometric data 404 provides information about the physicality of the modular sections 120, such as shape, physical dimensions, and so forth. The geometric data 404 is described in more detail below with regard to FIG. 5.

The spatial data system 126 is configured to process the digest data 402 and the geometric data 404. Modular device data 406 may be generated that is indicative of what modular device 122 is coupled to a particular socket 308 on a particular modular section 120. The modular device data 406 is described in more detail below with regard to FIG. 5.

The spatial data system 126 may also generate arrangement data 408 indicative of a relative configuration of the modular sections 120. The arrangement data 408 provides information indicative of which modular sections 120 are connected to which section interfaces 304 of neighbor modular sections 120. For example, the arrangement data 408 for the example physical configuration 310 may indicate that the section interface 304(4) of the modular section 120(1) is coupled to the section interface 304(5) of the modular section 120(4). In some implementations, the arrangement data 408 provides a layout indicative of a relative configuration of the modular sections 120 with respect to one another. The arrangement data 408 may be generated by processing the digest data 402 to identify commonalities between modular sections 120. For example, the digest data 402 may be filtered to find modular sections 120 that identify one another as neighbors. The arrangement data 408 is described in more detail below with regard to FIG. 5.

By utilizing the modular device data 406, the arrangement data 408, and the geometric data 404, the spatial data system 126 may generate spatial coordinates 410. The spatial coordinates 410 specify a point or region at which at least a portion of the modular section 120, the modular device 122, or both the modular section 120 and the modular device 122 may be found. For example, the spatial coordinates 410 may include device identifier 412, coordinates (such as at the socket 308) 414, and orientation 416.

The device identifier 412 may comprise a string, value, or other data that uniquely identifies the particular modular section 120 from other modular sections 120, within at least a single facility 102. In some implementations, the device identifier 412 may be unique across all facilities 102. The device identifier 412 provides information indicative of a particular modular device 122. For example, device identifier 412 may include a serial number, media access control (MAC) address, Internet protocol address, and so forth.

The coordinates 414 may be expressed in one-, two-, or three-dimensions. For example, the coordinates 414 may be expressed using a Cartesian system having three mutually orthogonal axes. Continuing the example, the spatial coordinates 414 may specify a position of the modular device 122(1) with respect to a three-dimensional X, Y, Z coordinate system as "(37, 11, 13)". In other implementations, the coordinates 414 may be designated in terms of angles and distances, such as using polar coordinates.

The orientation 416 may specify a direction along which a given axis of the socket 308 or the modular device 122 is arranged when coupled to the modular section 120. For example, the orientation 416 may indicate that a longest (or primary) axis of the modular device 122 is perpendicular to the X-Y plane and parallel to the Z axis.

Figure 5:
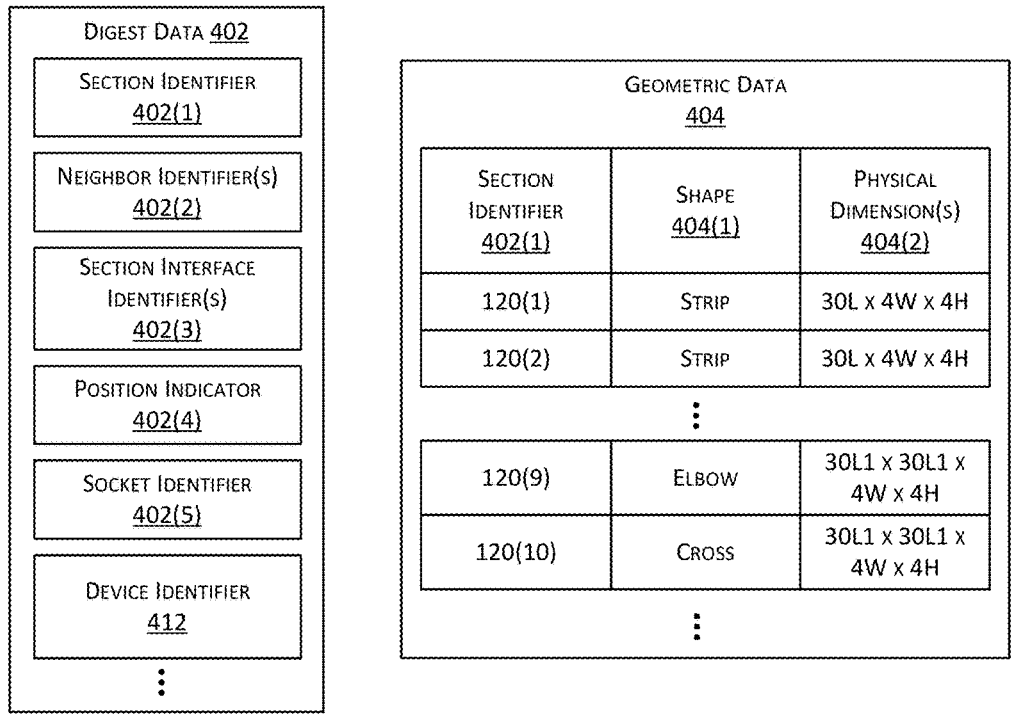
FIG. 5 is a block diagram of data associated with operation of the spatial data system, including digest data, geometric data, modular device data, and arrangement data, according to some implementations.
Figure 5:
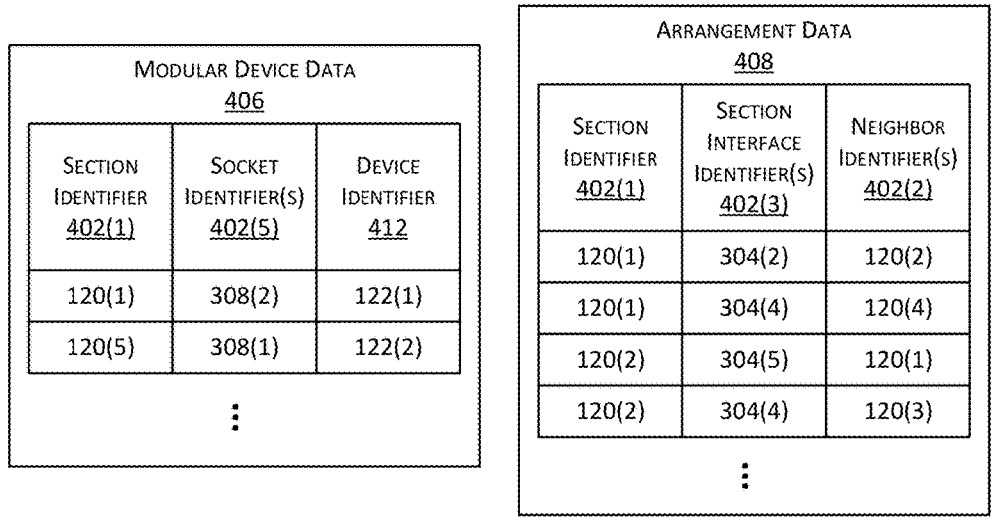

FIG. 5 is a block diagram 500 of data associated with operation of the spatial data system 126. As described above, the digest data 402 may comprises information about the modular section 120, the neighbor modular sections 120 coupled thereto, modular devices 122 coupled thereto, and so forth. At least a portion of the digest data 402 may be generated by, or on behalf of, an originating modular section 120. The digest data 402 may be exchanged between modular sections 120 that are coupled to one another, between the modular section 120 and a server, and so forth.

The digest data 402 may include a section identifier 402(1). The section identifier 402(1) may include a serial number, MAC address, Internet protocol address, network address, and so forth. The section identifier 402(1) is configured to uniquely identify the particular modular section 120 with respect to the other modular sections 120 in the same arrangement. For example, the section identifier 402(1) may be retrieved from memory on board the modular section 120.

The digest data 402 may include a neighbor identifier 402(2). The neighbor identifier 402(2) may be the section identifier 402(1) of the neighbor, as received by the originating modular section 120. For example, the modular sections 120(1) and 120(2) shown as coupled in the example physical configuration 310 may exchange with one another their respective section identifiers 402(1). From the perspective of the modular section 120(1) originating the digest data 402, the neighbor identifiers 402(2) may include the values of "120(2)" and "120(4)". From the perspective of the modular section 120(2) originating another set of digest data 402, the neighbor identifiers 402(2) may include the values of "120(1)" and "120(3)".

A section interface identifier 402(3) may be included in the digest data 402. The section interface identifier 402(3) provides information indicative of a particular section interface 304 on the modular section 120. The section interface identifier 402(3) may be unique within the scope of a single modular section 120, or the section interface identifier 402(3) may be unique across a plurality of modular sections 120. For example, the section interface identifier 402(3) may specify one of the six section interfaces 304(1)-(6) as depicted in FIG. 3 as an integer value of one through six. In another example, the section interface identifier 402(3) may be a MAC address.

Instead of, or in addition to, the section interface identifier 402(3), a position indicator 402(4) may be included in the digest data 402. The position indicator 402(4) may specify a position of a modular section 120, relative to the originating modular section 120. For example, the position indicator 402(4) may indicate one of the positions 306(1)-(6) as depicted in FIG. 3. In another example, the position indicator 402(4) may provide an indication such as "upper right", "upper lateral", "lower left", and so forth.

A socket identifier 402(5) provides information indicative of a particular socket 308 on the modular section 120. The socket identifier 402(5) may be unique within the scope of a single modular section 120, or the socket identifier 402(5) may be unique across a plurality of modular sections 120. For example, the socket identifier 402(5) may specify one of the three sockets 308(1)-(3) as depicted in FIG. 3 as an integer value of one through three. In another implementation, the socket identifier 402(5) may comprise an indication of a position on the modular section 120, such as a linear displacement of the socket 308 relative to a specified end of the modular section 120.

The digest data 402 may include the device identifier 412 as described above. The device identifier 412 provides information indicative of a particular modular device 122.

The digest data 402 may also include other data (not shown). For example, the digest data 402 may indicate a make or model of the originating or neighbor modular section 120. In another example, the digest data 402 may comprise physical dimensions, shape data, and so forth about the originating or neighbor modular section 120.

The digest data 402 may include spatial coordinates 410. Continuing the example, the spatial coordinates 410 for a neighboring modular section 120 may have been previously determined and stored by the originating modular section 120. The spatial coordinates 410 may then be included in the digest data 402, or otherwise be transferred between modular sections 120.

The geometric data 404 provides information about the physicality of the modular sections 120. The geometric data 404 may be associated with particular modular sections 120. For example, the geometric data 404 may include the section identifier 402(1) specifying a particular modular section 120. In another implementation, instead of or in addition to the section identifier 402(1), data indicative of a make, model, and so forth, may be provided. Data indicative of shape 404(1) may be included in the geometric data 404. The shape 404(1) may specify an overall physical manifestation of the structure of the modular section 120. For example, the shape 404(1) may be described as an elbow or right angle, T, cross, strip, and so forth. In implementations where the modular section 120 comprises one or more joints, the shape 404(1) may include information indicative of the physical configuration the modular section.

The geometric data 404 may include one or more physical dimensions 404(2). The physical dimensions 404(2) comprise dimensional information about the modular section 120. For example, the physical dimensions 404(2) may describe a distance between section interfaces 304, overall chassis shape such as length, height, and width, and so forth. In another example, the physical dimensions 404(2) may indicate the location of the socket 308 with respect to an origin point of the modular section 120. The physical dimensions 404(2) may be described in terms of a series or set of linear measurements. In some implementations, the geometric data 404 may be expressed in terms of a computer aided drafting (CAD) element or file. The geometric data 404 may be generated from manual measurement, CAD files, user entry, automated analysis such as with a range camera or laser scanner, and so forth.

The modular device data 406 is indicative of which modular device 122 is coupled to a particular socket 308 on a particular modular section 120. For example, the modular device data 406 may include section identifier 402(1), the socket identifier 402(5), and the (modular) device identifier 412. For example, the modular device data 406 indicates that the modular section 120(1) has the modular device 122(1) coupled to the socket 308(2). The modular device data 406 may be determined from the digest data 402. For example, a query may be run against the digest data 402 to output the fields of the modular device data 406.

The arrangement data 408 provides information indicative of which modular sections 120 are connected to which section interfaces 304 of neighboring modular sections 120. The arrangement data 408 may include the section identifier 402(1) of the originating modular section 120, the section interface identifiers 402(3), and the neighbor identifiers 402(2). For example, the arrangement data 408 depicted in FIG. 5 corresponding to the example physical configuration 310 indicates that the section interface 304(4) of the modular section 120(1) is coupled to the modular section 120(4). In some implementations, the arrangement data 408 may include a neighbor section interface identifier 402(3) corresponding to the section interface 304 of the neighbor modular section 120 that couples to the originating modular section 120. The position indicator 402(4) data may be used instead of, or in addition to, the section interface identifiers 402(3).

In some implementations the arrangement data 408 may include orientation data, such as a compass heading, inclination relative to local "down" due to Earth's gravity, manually entered data, default data, and so forth. The orientation data may be used to determine an orientation in real space of the modular section 120. Once known for a particular modular section 120, given predetermined fixed section interfaces 304 between neighboring modular sections 120, the orientation for other modular sections 120 may be determined.

In some implementations at least a portion of the data described herein may be entered manually. For example, one or more of the digest data 402, geometric data 404, the modular device data 406, the arrangement data 408, or the spatial coordinates 410 may be manually entered into the spatial data system 126 by a human operator. Continuing the example, during installation the human operator may manually enter arrangement data 408 for a modular section 120.

The data in FIG. 5 is depicted in a tabular format for ease of illustration and not by way of limitation. In other implementations, the data may be stored using other data structures such as trees, linked lists, executable code, key-value pairs, and so forth.

Figure 6:
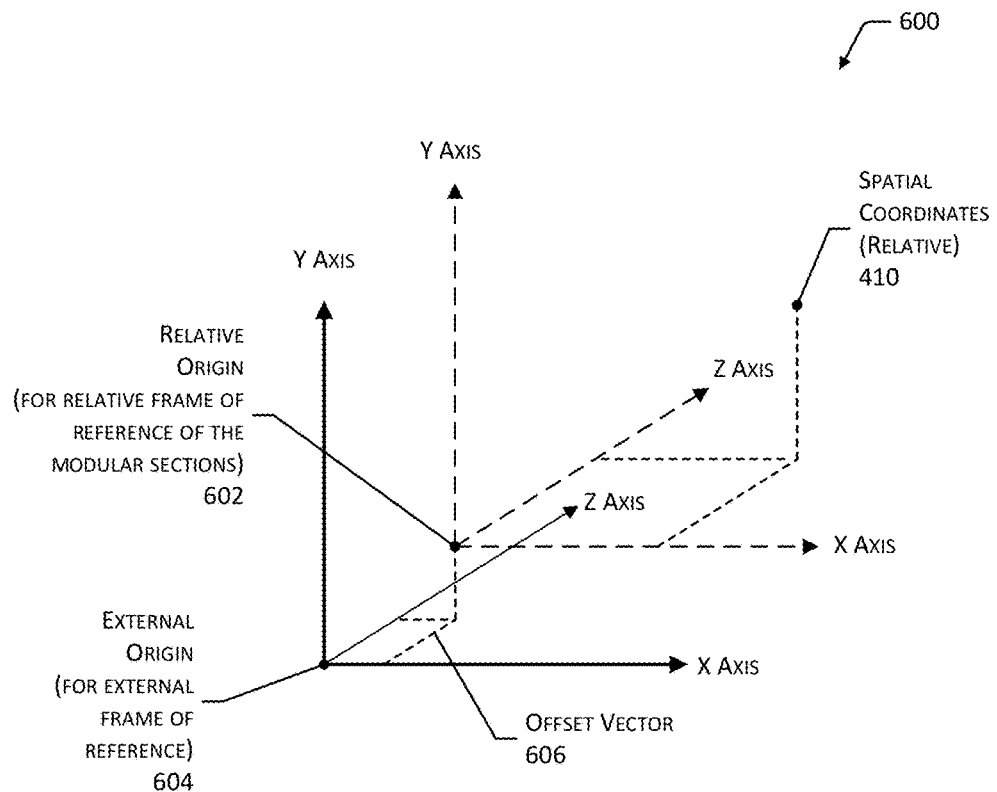
FIG. 6 is an illustration of a relative origin and corresponding relative frame of reference and an external origin and corresponding external frame of reference and transformation of coordinates from one frame of reference to another.
Figure 6:
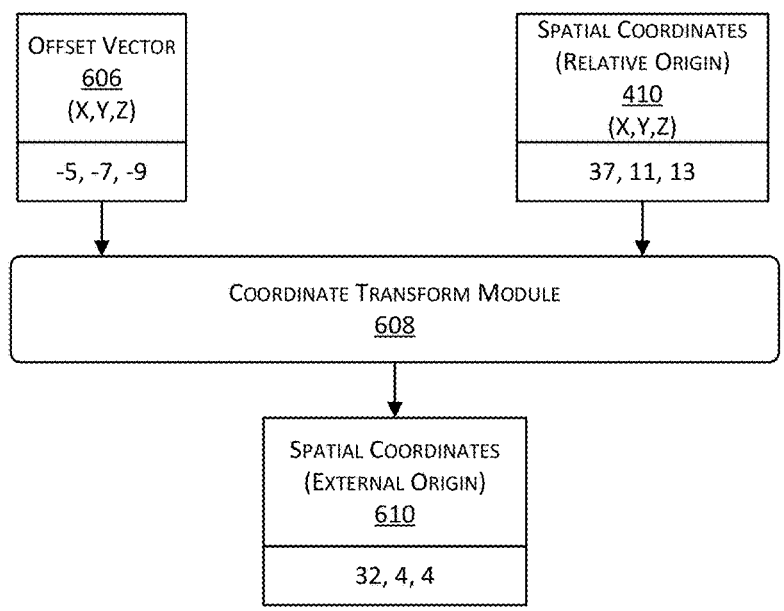

FIG. 6 is an illustration 600 of a relative origin and corresponding relative frame of reference, an external origin and corresponding external frame of reference, and a transformation of coordinates from one frame of reference to another. The spatial data system 126 is configured to generate spatial coordinates 410 corresponding to modular sections 120, modular devices 122, or portions thereof. The spatial coordinates 410 may be given with respect to an origin that is internal or relative to the arrangement of the modular sections 120. For example, the modular section 120 installed at a particular position within the facility 102 may be designated as an origin from which spatial coordinates 410 for all attached modular sections 120 are derived.

In this illustration, a relative origin 602 is depicted with regard to three mutually orthogonal axes, X, Y, and Z. The relative origin 602 may be associated with a particular modular section 120 or portion thereof. In one implementation, the relative origin 602 may comprise a root entry where the arrangement data 408 is expressed as a tree. In this illustration, the spatial coordinates 410 for a modular device 122(1) are depicted.

In some implementations, it may be advantageous to express the spatial coordinates 410 relative to a different origin that may be external to the arrangement of the modular sections 120. An external origin 604 is depicted with regard to three mutually orthogonal axes X, Y, and Z. For example, the external origin 604 may comprise a geographic datum such as a particular benchmark, or local benchmark defining a coordinate system for the facility 102.

An offset vector 606 provides information indicative of a difference between the relative origin 602 and the external origin 604. The offset vector 606 may include one or more of the following: translation along one or more axes, rotation relative to one or more axes, and so forth.

A coordinate transform module 608 may be configured to transform input spatial coordinates to output spatial coordinates representative of a location in space relative to a different origin, using a different coordinate system, or a combination thereof. For example, the coordinate transform module 608 may accept as input the offset vector 606 and the spatial coordinates 410 and generate spatial coordinates 610 with respect to the external origin 604.

In one implementation, the coordinate transform module 608 may add the offset vector 606 to a matrix comprising the input spatial coordinates to generate the output spatial coordinates. The coordinate transform module 608 may be configured to accept as input the spatial coordinates 610 with respect to the external origin 604, and provide as output the spatial coordinates 410 with respect to the relative origin 602.

Figure 7:
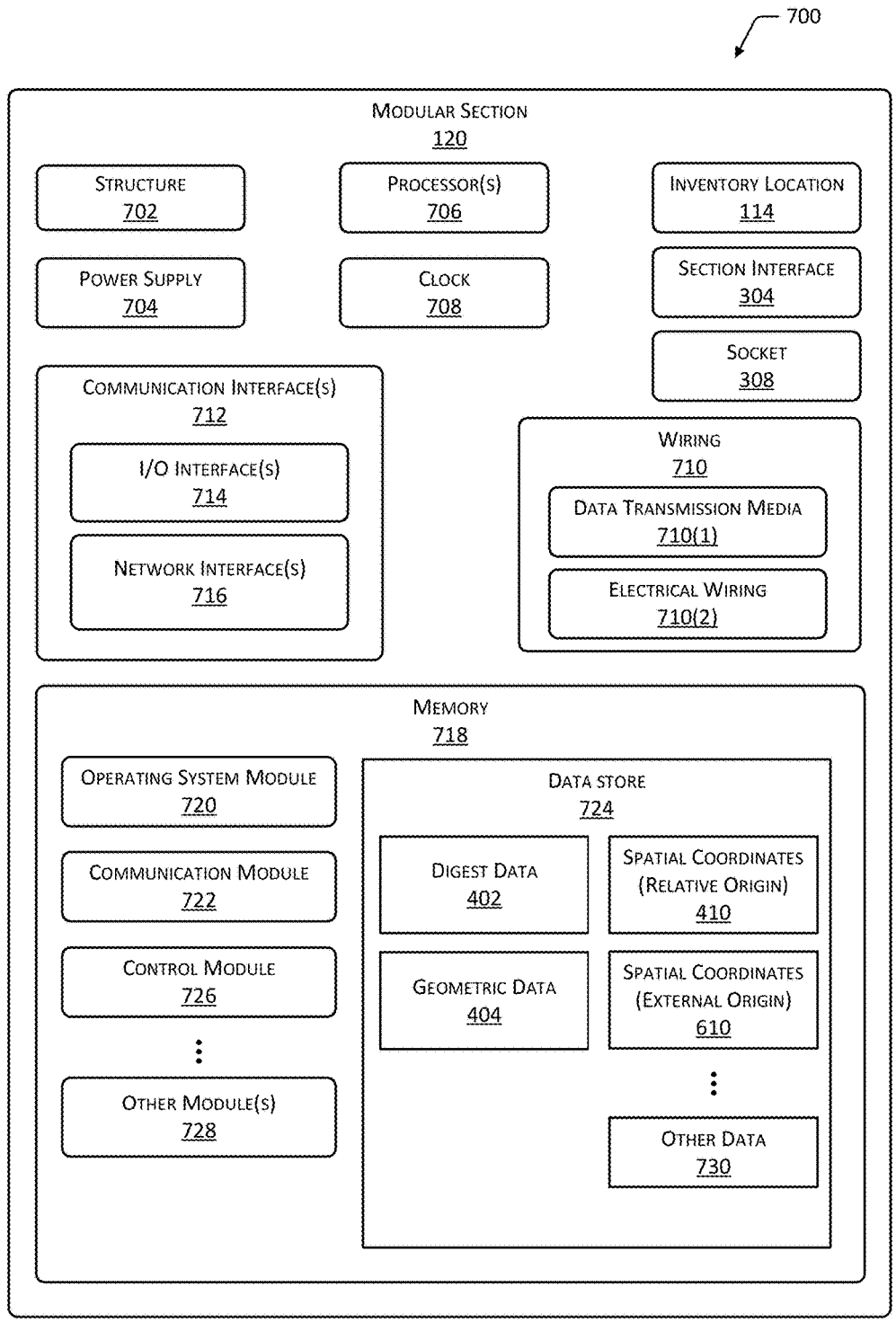
FIG. 7 illustrates a block diagram of a modular section, according to some implementations.

FIG. 7 illustrates a block diagram 700 of the modular section 120, according to some implementations. The modular section 120 may comprise a structure 702. The structure 702 may include components comprising one or more of metal, plastic, composite materials, ceramic, wood, and so forth. For example, the structure 702 may comprise a carbon-fiber frame or chassis. The structure 702 may comprise one or more fixed structural elements mechanically supporting the one or more section interfaces 304, sockets 308, and so forth. The section interfaces 304 and sockets 308 may be supported at locations in space that are predetermined, relative to one another. For example, the sockets 308 may be spaced at 30 centimeter (cm) intervals.

The modular section 120 may include a power supply 704. The power supply 704 is configured to provide electrical power suitable for operating the components in the modular section 120 or coupled thereto. For example, the power supply 704 may comprise batteries, capacitors, fuel cells, photovoltaic cells, wireless power receivers, conductive couplings suitable for attachment to an external power source, and so forth.

The modular section 120 may include one or more hardware processors 706 (processors) configured to execute one or more stored instructions. The processors 706 may comprise one or more cores. In some implementations, the processors 706 may comprise microcontrollers, application specific integrated circuits, systems on a chip (SoC), and so forth. One or more clocks 708 may provide information indicative of date, time, ticks, and so forth. For example, the processor 706 may use data from the clock 708 to generate a timestamp, trigger a preprogrammed action, and so forth.

The modular section 120 may, in some implementations, incorporate, or be combined with, an inventory location 114. For example, the modular section 120 may be built into a portion of a shelf used to stow items 104.

The modular section 120 may include one or more I/O devices (not shown). The I/O devices may include, but not limited to, the output devices 212, the emitters 214, or the sensors 216. For example, the modular section 120 may include a smoke detector, temperature sensor, audible alarm buzzer, and so forth. In another example, the modular section 120 may include one or more optical emitters 214(3) configured to provide illumination, such as room light to the user 116. In yet another example, the modular section 120 may include sensors 216 to determine orientation, such as accelerometers, magnetometers, tilt sensors, gravimeters, and so forth.

The modular section 120 may comprise one or more section interfaces 304. As described above, the section interface 304 allows the modular section 120 to couple to another modular section 120 or other device. The modular section 120 may also comprise one or more sockets 308. As described above, the socket 308 allows the modular section 120 to couple to one or more modular devices 122.

In one implementation, the section interface 304 and the socket 308 may comprise the same or similar connectors such that they may be used interchangeably. For example, in such an implementation, the modular section 120 may couple to another modular section 120 using the section interface 304 or the socket 308. In another example, the modular device 122 may couple to the modular section 120 using the section interface 304.

The modular section 120 may include wiring 710. The wiring 710 may comprise a data transmission media 710(1), electrical wiring 710(2), and so forth. The data transmission media 710(1) may comprise one or more of an electrical conductor, optical waveguide, acoustic waveguide, and so forth. For example, the data transmission media 710(1) may comprise optical fibers, twisted pair copper wiring, and so forth. The data transmission media 710(1) is configured to couple to one or more of the neighbor modular sections 120 at the section interfaces 304. For example, the section interfaces 304 may comprise contact pads, pins, or other connectors configured to establish a data connection with the neighbor modular section 120.

The electrical wiring 710(2) may comprise a set of one or more electrical conductors configured to transfer electrical power. The electrical wiring 710(2) may be configured to couple to one or more of the neighbor modular sections 120 at the section interfaces 304. For example, the section interfaces 304 may comprise contact pads, pins, or other connectors configured to establish an electrically conductive pathway.

In some implementations, the wiring 710 may be coupled to one or more of the sockets 308. For example, the socket 308 may include a connector to couple to the data transmission media 710(1), the electrical wiring 710(2), and so forth.

The wiring 710 may combine data transmission media and electrical wiring. For example, the wiring 710 may be configured to support power over Ethernet operation. In one implementation, the modular section 120 may be compliant with at least a portion of the IEEE 802.3-2012 specification as promulgated by the Institute of Electrical and Electronics Engineers (IEEE). In another implementation the section 120 may be compliant with at least a portion of the Universal Power over Ethernet specification as promulgated by Cisco Corp. of San Jose, Calif.

The modular section 120 may include one or more communication interfaces 712 such as input/output (I/O) interfaces 714, network interfaces 716, and so forth. The communication interfaces 712 enable the modular section 120, or components thereof, to communicate with other devices or components. The communication interfaces 712 may include one or more I/O interfaces 714. The I/O interfaces 714 may comprise inter-integrated circuit (I2C), serial peripheral interface (SPI) bus, Universal Serial Bus (USB) as promulgated by the USB Implementers Forum, RS-232, RS-485, and so forth. For example, the I/O interfaces 714 may comprise one or more universal asynchronous receiver/transmitters (UARTs).

The I/O interfaces 714 may be used to establish communication between the modular section 120 and a neighbor modular sections 120, with the modular device 122 connected to the socket(s) 308 of the modular section 120, and so forth. For example, an RS-485 connection may be established between neighboring modular sections 120. In some implementations, the I/O interfaces 714 may be used to provide communication between the modular section 120 and a controller or other external device such as the server 204.

The network interfaces 716 are configured to provide communications between the modular section 120 and other devices, such as the modular devices 122, the access points 210, the servers 204, and so forth. The network interfaces 716 may include devices configured to couple to personal area networks (PANs), local area networks (LANs), wide area networks (WANs), and so forth. For example, the network interfaces 716 may include devices compatible with Ethernet, Wi-Fi, Bluetooth, ZigBee, and so forth. The network interfaces 716 may be used instead of, or in addition to, the I/O interfaces 714 to establish communication between the modular section 120 and neighboring modular sections 120. In some implementations, the network interfaces 716 may be used to provide communication between the modular section 120 and a controller or other external device such as the server 204.

The modular section 120 may also include one or more busses or other internal communications hardware or software that allow for the transfer of data between the various modules and components of the modular section 120 or neighboring modular sections 120. For example, the communication interfaces 712 may be configured to use the wiring 710 to establish a bus between the modular section 120 and at least a portion of the one or more of the neighboring modular sections 120.

As shown in FIG. 7, the modular section 120 may include one or more memories 718. The memory 718 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 718 provides storage of computer-readable instructions, data structures, program modules, and other data for the operation of the server 204. A few example functional modules are shown stored in the memory 718, although the same functionality may alternatively be implemented in hardware, firmware, or as a SoC.

The memory 718 may include at least one operating system (OS) module 720. The OS module 720 is configured to manage hardware resource devices such as the I/O interfaces 714, the communication interfaces 712, and provide various services to applications or modules executing on the processors 706. The OS module 720 may implement a variant of the FreeBSD operating system as promulgated by the FreeBSD Project, other UNIX or UNIX-like variants, a variation of the Linux operating system, such as Android as promulgated by Google, Inc. of Mountain View, Calif., USA. Other OS modules 720 may be used, such as the Windows operating system from Microsoft Corporation of Redmond, Wash., USA; the LynxOS from LynxWorks of San Jose, Calif., USA; and so forth.

Also stored in the memory 718 may be a data store 724 and one or more of the following modules. These modules may be executed as foreground applications, background tasks, daemons, and so forth. The data store 724 may use a flat file, database, linked list, tree, executable code, script, or other data structure to store information. In some implementations, the data store 724 or a portion of the data store 724 may be distributed across one or more other devices including the servers 204, network attached storage devices, and so forth.

A communication module 722 may be configured to establish communications with one or more of the neighboring modular sections 120, the modular devices 122, the servers 204, or other devices. The communications may be authenticated, encrypted, and so forth.

The memory 718 may also store a control module 726. The control module 726 may be configured to use the communication module 722 to establish communications with neighboring modular sections 120, the modular device 122, and so forth. The control module 726 may access information in the data store 724, such as the digest data 402, geometric data 404, relative origin spatial coordinates 410, external origins spatial coordinate 610, offset vector 606, or other data. The control module 726 may be configured to generate digest data 402 corresponding to the local state of the modular section 120. The control module 726 may also receive digest data 402 from the neighboring modular sections 120.

The control module 726 may be configured to send digest data 402 to the server 204. The spatial data system 126 executing on the server 204 may be configured to generate the spatial coordinates 410 or 610.

In some implementations, the control module 726 may send digest data 402 to one or more other modular sections 120. For example, the modular sections 120 may operate in a store-and-forward mode, transferring digest data 402 from one modular section 120 to another.

The control module 726 may process at least a portion of the digest data 402. For example, the control module 726 may remove duplicate data from the digest data 402 received from the neighboring modular sections 120.

The control module 726 may be configured to determine the spatial coordinates of the modular section 120, or provide spatial coordinates to one or more of the neighboring modular sections 120 or the modular devices 122. For example, the server 204 or another modular section 120 may have provided spatial coordinates to the modular section 120(1) indicative of a location in space of the modular section 120(1) or the modular device 122(1). Upon coupling the modular section 120(2) to the modular section 120(1) as shown in the example physical configuration 310, the control module 726 of either modular section 120(1) or 120(2) may use the spatial coordinates and the geometric data 404 to calculate spatial coordinates of the modular section 120 (2), or a portion thereof such as the sockets 308. In this fashion, the spatial coordinate may be propagated throughout the modular sections 120.

In another implementation, the control module 726 may implement one or more functions of the spatial data system 126. For example, the control module 726 may generate spatial coordinates 410 based on the digest data 402 and the geometric data 404. The spatial coordinates 410 may be for the modular section 120, for neighboring modular sections 120, modular devices 122, and so forth.

In one implementation a control module 726 for one of the modular devices 122 in the physical configuration comprising a set of coupled modular sections 120 may be configured to provide initial spatial coordinates 410 or 610 to neighboring devices. For example, the modular section 120(1) may be installed and has a centroid determined to be located at the coordinates 610 of (5, 5, 5), relative to the external origin 604. The modular section 120(1) may provide its coordinates 610 of (5 cm, 5 cm, 5 cm) to the neighboring modular section 120(2). The modular section 120(2) may determine that modular section 120(1) is connected thereto in the position 306(5), given that section interface 304(5) is providing the coupling between them. The control module 726 of the modular section 120(2) may access geometric data 404 indicating that the shape 404(1) of the modular section 120(1) and (2) is a strip having a length of 30 cm, and the centroid located at 15 cm from the section interfaces 304 at either. Based on the physical configuration 310 of the modular section 120(1) and the determined interconnection, the control module 726 may determine the centroid of the modular section 120(2) is displaced +30 cm along the X axis, relative to the centroid of the modular section 120(1). Thus, the coordinates of the (centroid of) the modular section 120(2) may be (35, 5, 5).

The control module 726 may be configured to provide digest data 402 or other information indicative of a change in the status of the modular section 120. For example, the modular device 122 may be detected at a particular socket 308. Responsive to this detection, the control module 726 may receive the device identifier 412 from the modular device 122, provide the modular device 122 with the spatial coordinates 410 or 610, and so forth.

In some implementation the control module 726 may accept as input data from sensors 216 to determine orientation with respect to the outside environment. The sensors may be onboard the modular device 120, or may comprise a modular device 122. For example, a gravimeter or inclinometer in a modular device 120 may indicate which way is local "down". In another example, a magnetometer may use the Earth's magnetic field to determine orientation.

Other modules 728 may also be present in the memory 718. For example, power management module may be configured to selectively direct electrical power to particular section interfaces 304. The data store 724 may also store other data 730. For example, the other data 730 may comprise time of installation data, time of last update of the spatial coordinates 410 or 610, and so forth.

In some implementations the modular section 120 may be configured to implement one or more power management features. For example, during startup of the system 100, the modular sections 120 may be configured to be activated in a "ripple start" mode to reduce a spike in power consumption. For example, the modular section 120(1) may be configured to, upon power up, send a signal configured to power up adjacent devices in a particular sequence. Continuing the example, the modular section 120(1) may send a wakeup signal to the neighboring modular devices 122 coupled to the section interfaces 304 in sequence, starting with the first section interface 304(1), waiting a predetermined amount of time, and proceeding to use the second section interface 304(2), and so forth. As a result, the modular sections 120, or the modular devices 122 attached thereto, may be powered on in a way that minimizes the potential to overload the power capacity of the electrical wiring 710(2). In some implementations this may also improve system performance by allowing progressive exchange of digest data 402 to neighboring modular sections 120.

Figure 8:
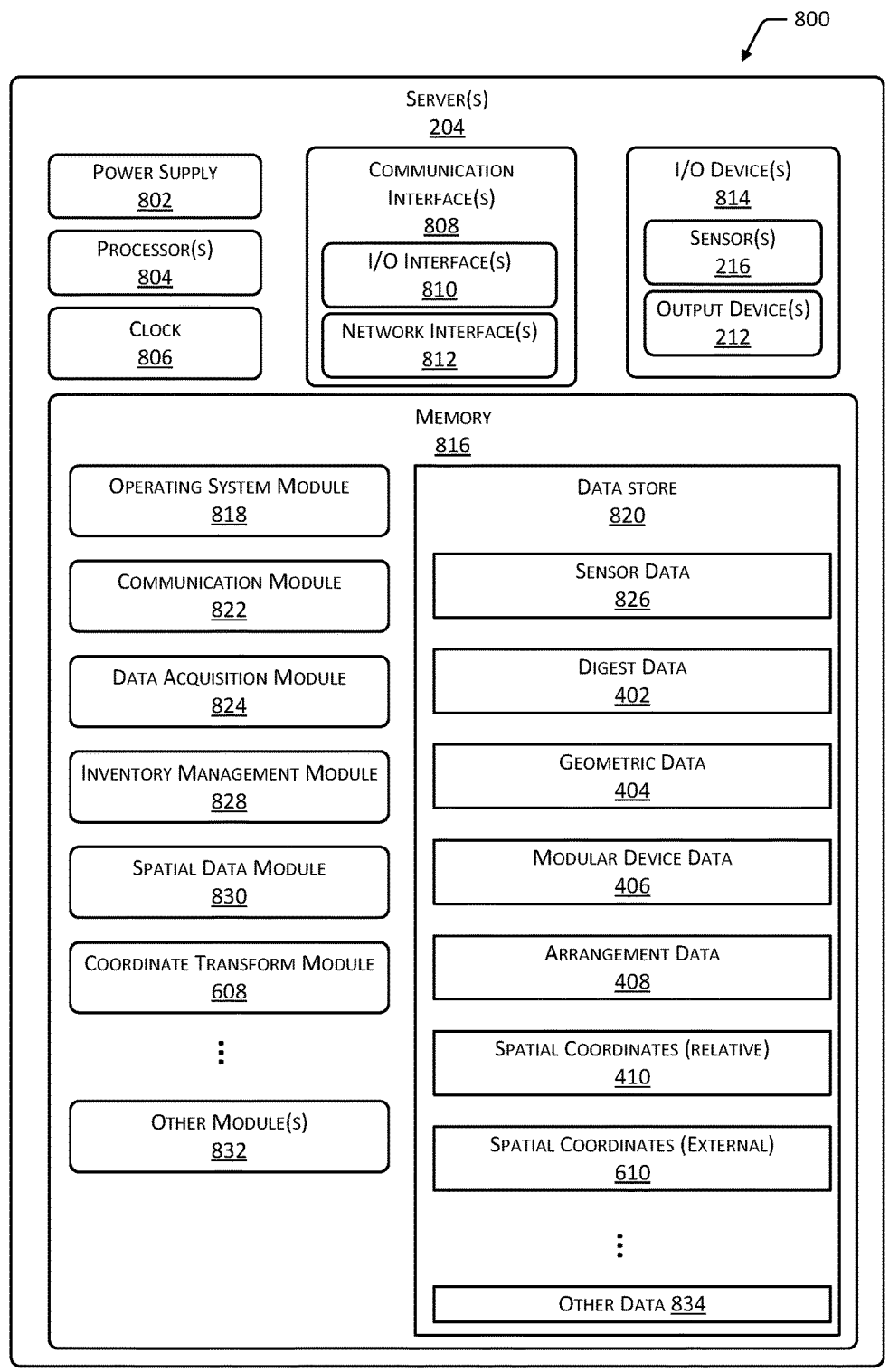
FIG. 8 illustrates a block diagram of a server configured to support operation of the materials handling facility, according to some implementations.

FIG. 8 illustrates a block diagram 800 of a server 204 configured to support operation of the facility 102, according to some implementations. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing", "software as a service (SaaS)", "platform computing", "network-accessible platform", "cloud services", "data centers", and so forth. Services provided by the server 204 may be distributed across one or more physical or virtual devices.

One or more power supplies 802 are configured to provide electrical power suitable for operating the components in the server 204. The server 204 may include one or more hardware processors 804 (processors) configured to execute one or more stored instructions. The processors 804 may comprise one or more cores. One or more clocks 806 may provide information indicative of date, time, ticks, and so forth. For example, the processor 804 may use data from the clock 806 to generate a timestamp for comparison with timestamps received from the cameras 216(1), trigger a preprogrammed action, and so forth.

The server 204 may include one or more communication interfaces 808 such as I/O interfaces 810, network interfaces 812, and so forth. The communication interfaces 808 enable the server 204, or components thereof, to communicate with other devices or components. The communication interfaces 808 may include one or more I/O interfaces 810. The I/O interfaces 810 may comprise I2C, SPI, USB, RS-232, RS-485, and so forth.

The I/O interface(s) 810 may couple to one or more I/O devices 814. The I/O devices 814 may include input devices such as one or more of a sensor 216, keyboard, mouse, scanner, and so forth. The I/O devices 814 may also include output devices 212 such as one or more of a display device 212(3), printer, audio speakers, and so forth. In some embodiments, the I/O devices 814 may be physically incorporated with the server 204 or may be externally placed.

The network interfaces 812 are configured to provide communications between the server 204 and the modular sections 120, modular devices 122, the totes 118, access points 210, and so forth. The network interfaces 812 may include devices configured to couple to PANs, LANs, WANs, and so forth. For example, the network interfaces 812 may include devices compatible with Ethernet, Wi-Fi, Bluetooth, ZigBee, and so forth.

The server 204 may also include one or more busses or other internal communications hardware or software that allow for the transfer of data between the various modules and components of the server 204.

As shown in FIG. 8, the server 204 includes one or more memories 816. The memory 816 comprises one or more CRSM, as described above. The memory 816 provides storage of computer-readable instructions, data structures, program modules, and other data for the operation of the server 204. A few example functional modules are shown stored in the memory 816, although the same functionality may alternatively be implemented in hardware, firmware, or as a SoC.

The memory 816 may include at least one OS module 818. The OS module 818 is configured to manage hardware resource devices such as the I/O interfaces 810, the I/O devices 814, the communication interfaces 808, and provide various services to applications or modules executing on the processors 804. The OS module 818 may implement a variant of the FreeBSD operating system as promulgated by the FreeBSD Project; other UNIX or UNIX-like variants; a variation of the Linux™ operating system as promulgated by Linus Torvalds; the Windows operating system from Microsoft Corporation of Redmond, Wash., USA; and so forth.

Also stored in the memory 816 may be a data store 820 and one or more of the following modules. These modules may be executed as foreground applications, background tasks, daemons, and so forth. The data store 820 may use a flat file, database, linked list, tree, executable code, script, or other data structure to store information. In some implementations, the data store 820 or a portion of the data store 820 may be distributed across one or more other devices including the servers 204, network attached storage devices, and so forth.

A communication module 822 may be configured to establish communications with one or more of the modular sections 120, modular devices 122, other servers 204, or other devices. The communications may be authenticated, encrypted, and so forth.

A data acquisition module 824 may be configured to acquire and access sensor data 826 associated with operation of the facility 102. The sensor data 826 may be stored in the data store 820. The sensor data 826 comprises information acquired from, or based on, the one or more sensors 216. For example, the sensor data 826 may comprise signal strength data from a plurality of microphones 216(5) configured to detect ultrasonic signals from an ultrasonic tag.

An inventory management module 828 is configured to provide the inventory functions as described herein with regard to the inventory management system 124. For example, the inventory management module 828 may track items 104 between different inventory locations 114, to and from the totes 118, and so forth. Arrays of one or more of the emitters 214 or the sensors 216 may be used to generate the data used to track the items 104. By using the spatial coordinates 410 or 610 indicative of the location of the emitters 214, sensors 216, or both the emitters 214 and sensors 216, the inventory management module 826 may determine the location of the object being tracked. For example, based on known locations of the microphones 216(5), the inventory management module 828 may determine a location of the ultrasonic tag within the facility 102.

The spatial data module 830 is configured to provide the functions associated with the spatial data system 126. For example, the spatial data module 830 may be configured to receive or otherwise access the digest data 402 and the geometric data 404 to generate the spatial coordinates 410.

The spatial data module 830 may receive digest data 402 from the modular sections 120, modular devices 122, or a combination thereof. For example, at least a portion of the modular sections 120 may transmit their digest data 402 using the communication interfaces 712 to the server 204. In some implementations, the spatial data module 830 may be configured to poll at least a portion of the modular sections 120 for digest data 402. The polled data may then be processed as described above.

The coordinate transform module 608 may also be stored in the memory 816. As described above with regard to FIG. 6, the coordinate transform module 608 may be configured to accept first set of spatial coordinates and output a second set of spatial coordinates indicative of the same location in three-dimensional space but with regard to a different origin or coordinate system. For example, the coordinate transform module 608 may accept as input spatial coordinates 410 with respect to the relative origin 602 and output spatial coordinates 610 with respect to the external origin 604.

In some implementations, the spatial data module 830 may distribute spatial coordinates 410 or 610 to at least some of the modular sections 120, the modular devices 122, or both. For example, the spatial data module 830 may process the digest data 402 and the geometric data 404 as described above with regard to FIG. 4 to generate the spatial coordinates 410 for one or more of the modular sections 120 or the modular devices 122. Once generated, the communication module 822 may provide spatial coordinates 410 to the respective devices.

Other modules 832 may also be present in the memory 816, as well as other data 834 in the data store 820. For example, the other modules 832 may include an analysis module while the other data 854 may include item data, user data, and so forth. The analysis module may be configured to track the movement of objects, such as items 104, users 116, totes 118, and so forth, in the facility 102, using the sensor data 826 acquired by the modular devices 122 mounted to the modular sections 120. Other modules 832 may also generate user interface data, process user input, process orders for pick and place, and so forth.

Illustrative Processes

Figure 9:
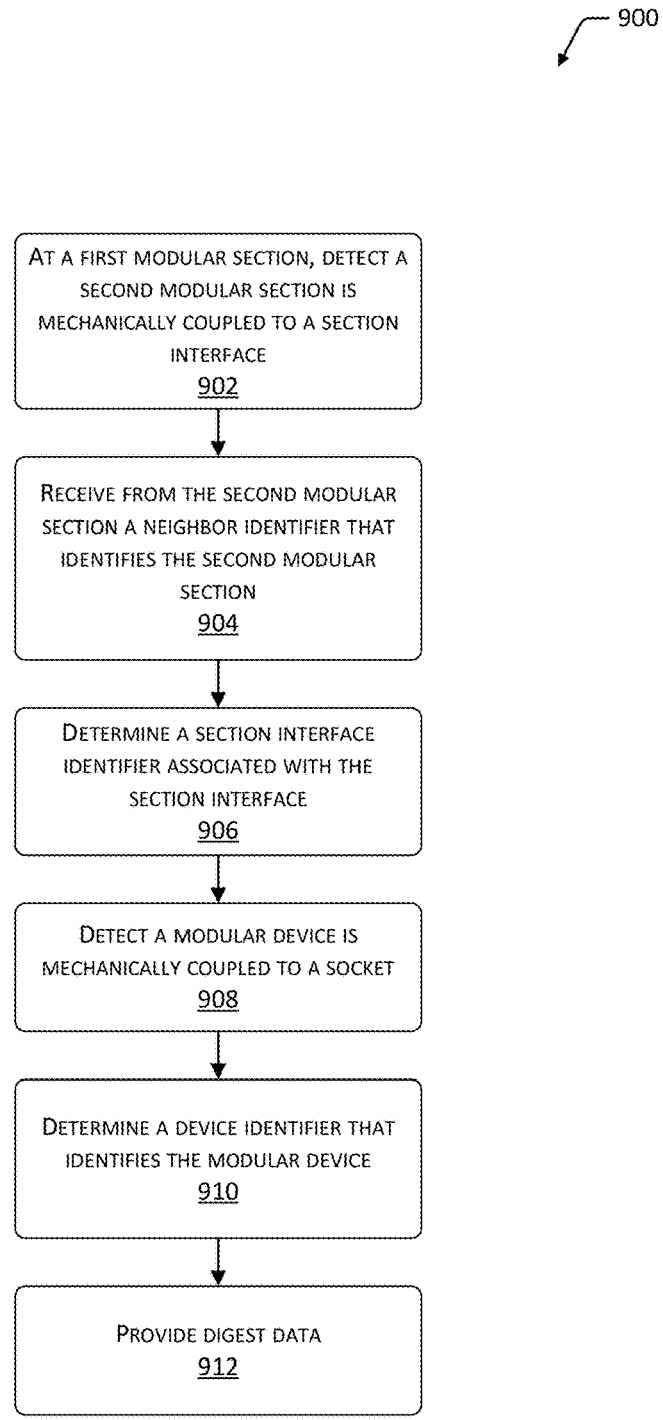
FIG. 9 depicts a flow diagram of a process of modular sections communicating with one another to provide digest data.

FIG. 9 depicts a flow diagram 900 of a process of a plurality of modular sections 120 communicating with one another to provide digest data 402 to one another. In some implementations, the process may be performed at least in part by the control module 726.

Block 902 detects, at a first modular section 120(1), that a second modular section 120(2) is coupled to a section interface 304. For example, a mechanical coupling between the first modular section 120(1) and the second modular section 120(2) may complete an electrical circuit providing a signal to the processors 706.

Block 904 receives from the second modular section 120(2) a neighbor identifier 402(2) that identifies the second modular section 120(2). In some implementations, the data may be received by way of a serial communication interface, such as one or more UARTs.

Block 906 determines a section interface identifier 402(3) associated with the section interface 304 of the first modular section 120(1) to which the neighboring second modular section 120(2) is coupled. In some implementations, the section interface identifier 402(3) may be indicative of a position 306 of the second modular section 120(2) with respect to the first modular section 120(1).

Block 908 detects a modular device 122 is mechanically coupled to a socket 308 of the first modular section 120(1). For example, the modular device 122 may use one or more of the I/O interfaces 714 or the network interfaces 716 to establish communication with the control module 726.

Block 910 determines a device identifier 412 that identifies the modular device 122. For example, the modular device 122 may be interrogated by the control module 726 and return the device identifier 412.

Block 912 provides digest data 402 to another device.

In one implementation, the digest data 402 may be provided to the server 204 or another computing device. As described above server 204 or other computing device may include the spatial data module 830 configured to determine the arrangement data 408 indicative of the physical configuration of the modular section 120 or the modular device 122 and the neighbor modular sections 120.

In another implementation, the digest data 402 may be provided to the modular device 122. For example, modular device 122 may comprise a communication interface configured to communicate with the server 204 or with other modular sections 120. In such implementation, the modular section 120 may provide a physical framework, electrical power such as the electrical wiring 710(2), but may omit the communication interface 712 or associated data transmission media 710(1).

In yet another implementation, the digest data 402 may be distributed to other modular sections 120. For example, the first modular section 120(1) may provide digest data 402 to the neighboring second modular section 120(2). In some implementations, the exchange of digest data 402 or a portion thereof may be multidirectional such that modular sections 120 send and receive digest data 402.

As described above with regard to FIG. 5, the digest data 402 may comprise one or more of the following: a section identifier 402(1) that identifies the first modular section 120(1), the neighbor identifier 402(2), the section interface identifier 402(3), or the device identifier 412.

In some implementations, the digest data 402 may include information from the modular device 122. For example, the communication interface 712 of the modular section 120 may be used to receive data from the modular device 122 coupled to the socket 308.

Figure 10:
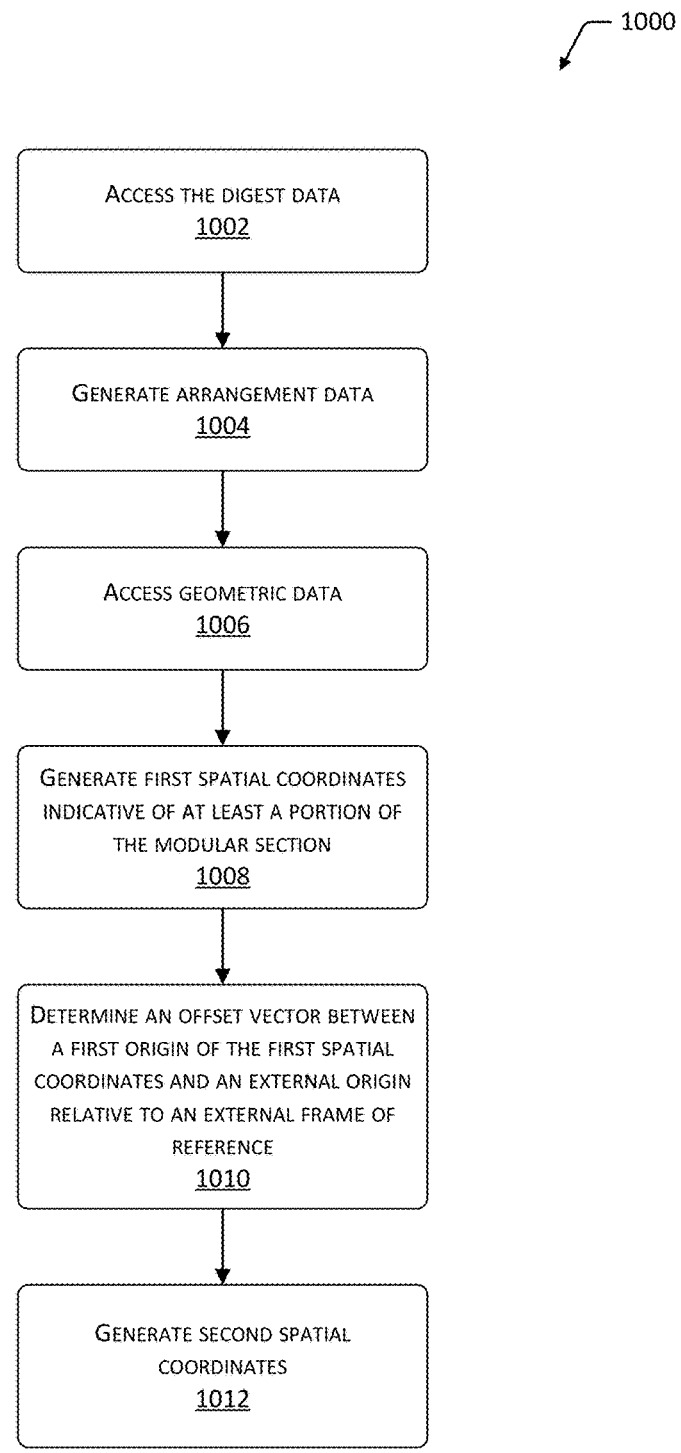
FIG. 10 depicts a flow diagram of a process for determining spatial coordinates of at least a portion of the modular section.

FIG. 10 depicts a flow diagram 1000 of a process for determining spatial coordinates 410 of at least a portion of the modular section 120. The spatial coordinates 410 may be representative of a location in space of a reference point or set of reference points of the modular section 120. For example, the spatial coordinates 410 may designate a centroid of the chassis of the modular section 120. The process may be implemented at least in part by one or more of the control module 726, the spatial data module 830, or the coordinate transform module 608.

Block 1002 accesses the digest data 402. For example, the control module 726 may generate digest data 402 corresponding to a local state of the modular section 120 and receive digest data 402 from neighboring modular sections 120 that have been coupled to the section interfaces 304. In some implementations, the digest data 402 may be distributed across only a single hop or modular section 120, or the digest data 402 may be forwarded or otherwise transferred across several modular sections 120. For example, each modular section 120 may store-and-forward digest data 402 as received from one modular section 120, and pass that digest data 402 on to another modular section 120.

Block 1004 generates, using the digest data 402, arrangement data 408 indicating a relative physical configuration of the first modular section 120(1) and the second modular section 120(2) with respect to one another. For example, the arrangement data 408 corresponding to the example physical configuration 310 indicates that the section interface 304(2) of the modular section 120(1) is coupled to the modular section 120(2). Continuing the example, the arrangement data 408 may include data that indicates the modular section 120(1) is coupled to the section interface 304(5) of the modular section 120(2).

In one implementation, the arrangement data 408 may be generated by matching section identifiers 402(1) with corresponding neighbor identifiers 402(2). For example, a first modular section 120(1) may determine a first section identifier 402(1)(1) of the first modular section 120(1) appears in the digest data 402 as first neighbor identifier 402(2)(1) data of a second modular section 120(2). For the second modular section 120(2), a second section identifier 402(1)(2) of the second modular section 120(2) appears in the digest data 402 as second neighbor identifier 402(2)(2) of the first modular section 120(1). A first section interface 304(2) is determined as connecting the first modular section 120(1) to the second modular section 120(2). For example, the connection may be determined based on a match between the section identifier 402(1) and the neighbor identifier 402(2).

The position 306 of the section interface 304 relative to the modular section 120 may be determined. For example, the position 306(2) corresponding to the section interface 304(2) may be retrieved from a lookup table or other data structure.

A second section interface 304(5) is determined as connecting the first modular section 120(1) to the second modular section 120(2). A second position 306(5) of the second section interface 304(5) relative to the second modular section 120(2) is determined. For example, the position 306(5) corresponding to the section interface 304(5) may be retrieved from a lookup table or other data structure.

Block 1006 accesses geometric data 404. As described above, the geometric data 404 provides information indicative of one or more physical dimensions of the first modular section 120(1) and the second modular section 120(2). For example, the accessing may comprise retrieving one or more physical dimensions 404(2) and shape 404(1) data associated with the modular section 120 associated with the section identifier 402(1). The geometric data 404 for neighboring modular sections 120 may also be retrieved. For example, one or more physical dimensions 404(2) and shape 404(1) data associated with the one or more neighbor identifiers 402(2) may be retrieved from memory. In some implementations, the geometric data 404 may be associated with a particular make or model of modular section 120.

Block 1008 generates, using the arrangement data 408 and the geometric data 404, relative spatial coordinates 410. The relative spatial coordinates 410 may be indicative of a location of the modular device 122 with respect to an origin within the array of the modular sections 120. In another implementation, the relative spatial coordinates 410 may be indicative of at least a portion of the modular section 120. For example, the relative spatial coordinates 410 may indicate the coordinates associated with a socket 308.

The generating of the spatial coordinates 410 may include accessing the arrangement data 408. One or more physical dimensions 404(2) and a shape 404(1) are assigned to each of the modular sections 120 in the arrangement data 408.

A model of the plurality of modular sections 120 may be generated. The model combines the physical arrangement or configuration corresponding to the interconnected modular sections 120 with corresponding physical dimensions 404(2) and shapes 404(1) applied. Generation of the model may include error checking, disambiguation, deduplication, and so forth. In one implementation, the model may comprise a computer aided design three-dimensional drawing. In another implementation, the model may comprise the arrangement data 408 as augmented with the geometric data 404 and the modular device data 406.

Placement of the socket 308 or other portion of the modular section 120 may be determined within the model. For example, the model may be searched for the socket 308(2) of the modular section 120(1). The model may include the modular device data 406, providing information indicative of which socket 308 the modular device 122 is coupled to.

The spatial coordinates using the determined placement may be determined. For example, given the geometry of the model and relative to an origin of the model such as the relative origin 602, the spatial coordinates 410 for a point within the model may be determined.

As described above, in some implementations, it may be advantageous to convert the spatial coordinates to refer to an alternative orientation or origin. Block 1010 determines an offset vector 606 between a relative origin 602 of the relative spatial coordinates 410 and an external origin 604 relative to an external frame of reference.

Block 1012 generates second spatial coordinates using the offset vector 602. For example, the external spatial coordinates 610 may be generated from the relative spatial coordinates 410. The external spatial coordinates 610 may refer to one or more of the modular device 122 or a portion of the modular section 120.

Once generated, the spatial coordinates 410 or 610 may be provided to the modular device 122. For example, one or more of the spatial coordinates 410 or 610 may be transmitted to the modular device 122 by way of one or more of the communication interfaces 712. The modular device 122 may use the spatial coordinates 410 or 610 for subsequent operation. For example, where the modular device 122 comprises a camera 216(1), the image data provided by the camera 216(1) may include the spatial coordinates 410 or 610 embedded therein. In another example, the modular device 122 may be configured to emit a signal based at least in part on the spatial coordinates 410 or 610. Continuing the example, the modular device 122 may be configured to transmit the spatial coordinates 410 or 610. Other devices in the facility 102, such as the tote 118, may be configured to receive and use the transmitted spatial coordinates 410 or 610 to determine their location within the facility 102.

Figure 11:
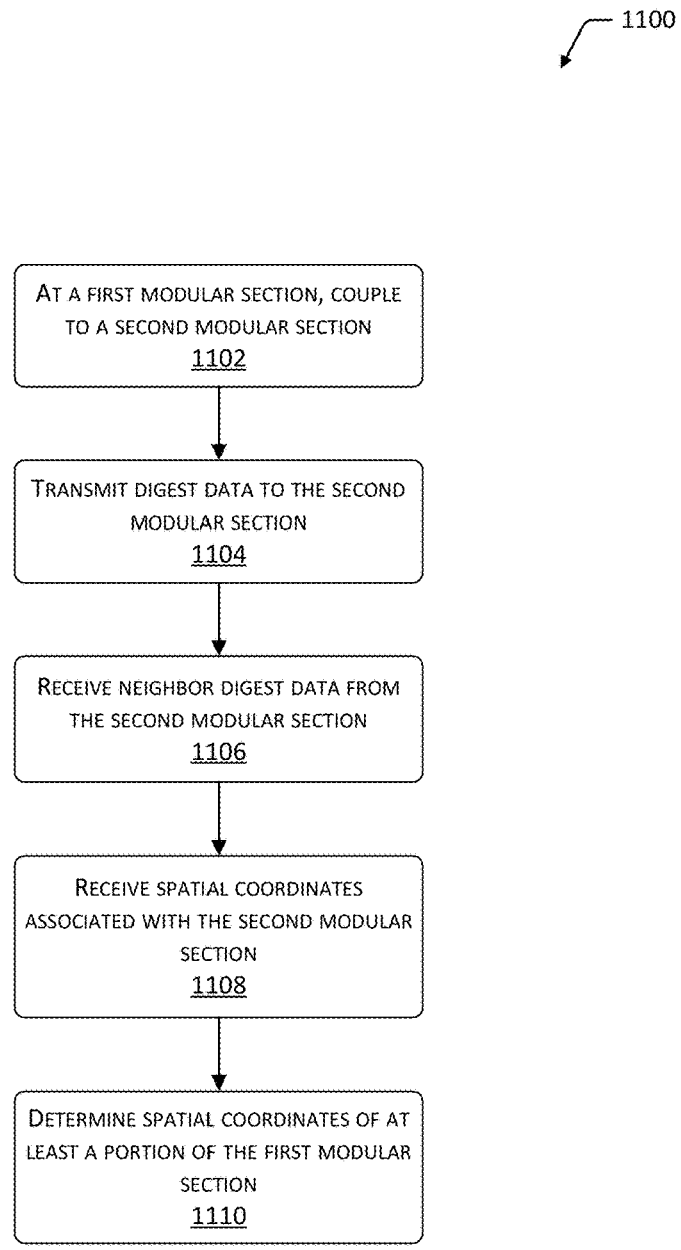
FIG. 11 depicts a flow diagram of a process for exchanging data between modular sections and determining spatial coordinates of at least a portion of the modular sections.

FIG. 11 depicts a flow diagram 1100 of a process for exchanging data between modular sections 120 and determining spatial coordinates 410 or 610 of at least a portion of the modular sections 120. The process may be implemented at least in part by the control module 726. Using this process may allow a single set of spatial coordinates 410 or 610 to be propagated throughout an arrangement of a plurality of modular sections 120.

Block 1102, at a first modular section 120(1), couples to a second modular section 120(2). For example, the section interface 304(2) of the first modular section 120(1) may couple to the section interface 304(5) of the second modular section 120(2).

Block 1104 transmits at least a portion of digest data 402 to the second modular section 120(2). The digest data 402 may comprise information originating with the first modular section 120(1), received from other neighboring modular sections 120, or both. For example, the first modular section 120(1) may use an I/O interface 714 to transmit the digest data 402 to the second modular section 120(2).

Block 1106 receives neighbor digest data 402 from the second modular section 120(2). Continuing the example above, the first modular section 120(1) may receive the digest data 402 from the second modular section 120(2) using the I/O interface 714.

Block 1108 receives spatial coordinates 410 or 610 associated with the second modular section 120(2). For example, the control module 726 of the neighboring second modular section 120(2) may have stored within its data store 724 one or more of the spatial coordinates 410 or 610. The spatial coordinates 410 or 610 provided by the second modular section 120(2) may be indicative of a reference point such as a centroid of the second modular section 120(2).

Block 1110 determines spatial coordinates 410 or 610 of at least a portion of the first modular section 120(1). For example, the control module 726 may use geometric data 404 stored within the memory 718 to access the shape 404(1) and the physical dimensions 404(2) of the first modular section 120(1) and a second modular section 120(2). Given the known dimensions and the known position 306, the control module 726 may calculate the spatial coordinates 410 or 610 of the portion of the first modular section 120(1) by summing the provided spatial coordinates 410 or 610 with vectors corresponding to the physical dimensions 404(2) and the shape 404(1).

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
 a first modular section of an array of a plurality of modular sections, the first modular section comprising:
  a section interface comprising a connector configured to mechanically couple to a second modular section of the array;
  a socket configured to mechanically couple the first modular section to a modular device;
  a serial communication interface; and
  a first hardware processor configured to execute computer-executable instructions to:
   detect a change in an electrical signal indicating that the second modular section is mechanically coupled to the section interface;
   receive from the second modular section, using the serial communication interface, a neighbor identifier that identifies the second modular section;
   determine a section interface identifier associated with the section interface, wherein the section interface identifier is indicative of a position of the section interface with respect to the first modular section;
   detect a change in an electrical signal indicating that the modular device is mechanically coupled to the socket;
   determine a device identifier that identifies the modular device;
   provide to a computing device digest data comprising:
    a section identifier that identifies the first modular section;
    the neighbor identifier;
    the section interface identifier; and
    the device identifier; and
 the computing device comprising:
  a second hardware processor configured to execute second computer-executable instructions to:
   access the digest data;
   generate, using the digest data, arrangement data indicating a relative physical configuration of the first modular section and the second modular section with respect to one another;
   access geometric data indicative of one or more physical dimensions of the first modular section and one or more physical dimensions of the second modular section; and
   generate, using the arrangement data and the geometric data, relative spatial coordinates indicative of a location of the modular device with respect to a designated origin of the array of the plurality of modular sections.

2. The system of claim 1, the computing device further configured to execute the second computer-executable instructions to:
 determine an offset vector between the designated origin of the array and an external origin of an external frame of reference; and
 generate, using the offset vector, external spatial coordinates for the modular device.

3. The system of claim 1, the modular device comprising a sensor configured to generate sensor data about an object in a facility; and
 the second hardware processor further configured to execute the second computer-executable instructions to:
  determine a location of the object using the relative spatial coordinates and the sensor data.

4. A device comprising:
 one or more section interfaces, wherein each section interface is configured to couple to a neighbor device to form an array of devices arranged in a fixed framework in space relative to one another;
 one or more sockets;
 a communication interface configured to:
  establish communication with one or more of:
   one or more neighbor devices coupled to the one or more section interfaces, or
   one or more modular devices coupled to the one or more sockets; and
  receive first digest data from the one or more neighbor devices coupled to the one or more section interfaces; and
 a first hardware processor configured to execute computer-executable instructions to:
  generate second digest data; and
  provide, using the communication interface, the second digest data to at least a portion of the one or more neighbor devices.

5. The device of claim 4, wherein one or more of the first digest data or the second digest data comprise one or more of:
 a section identifier that identifies a device that generated the one or more of the first digest data or the second digest data;
 a neighbor identifier that identifies the neighbor device of the device that generated the one or more of the first digest data or the second digest data;
 a position indicator that designates a position of the neighbor device with respect to the device that generated the one or more of the first digest data or the second digest data;
 a section interface identifier that designates a particular section interface to which the neighbor device of the device that generated the one or more of the first digest data or the second digest data is coupled;
 a device identifier that identifies one of the one or more modular devices coupled to one of the one or more sockets of the device that generated the one or more of the first digest data or the second digest data; or
 a socket identifier that designates the one of the one or more sockets to which the one of the one or more modular devices is coupled to.

6. The device of claim 4, the first hardware processor further configured to execute the computer-executable instructions to:
 send, using the communication interface, the second digest data to the one or more modular devices coupled to the one or more section interfaces.

7. The device of claim 4, the first hardware processor further configured to execute the computer-executable instructions to:
 provide one or more of the first digest data or the second digest data to a computing device, wherein the computing device comprises a second hardware processor configured to execute second computer-executable instructions to:
  determine a section identifier of the device is in the first digest data as a neighbor identifier relative to one of the one or more neighbor devices;
  determine one of the one or more section interfaces couples the device to the one of the one or more neighbor devices;

determine a position of the one section interface with respect to the device; and
store data indicative of the one of the one or more neighbor devices at the position.

8. The device of claim 4, the first hardware processor further configured to execute the computer-executable instructions to:
provide, using the communication interface, the first digest data and the second digest data to at least a portion of the one or more neighbor devices.

9. The device of claim 4, the first hardware processor further configured to execute the computer-executable instructions to:
receive, using the communication interface, data from the one or more modular devices coupled to one of the one or more sockets.

10. The device of claim 4, further comprising:
a chassis comprising one or more of metal, plastic, or ceramic, wherein the chassis mechanically supports the one or more section interfaces and the one or more sockets at locations in space that are predetermined relative to one another.

11. The device of claim 4, the first hardware processor further configured to execute the computer-executable instructions to:
generate, using the first digest data and the second digest data, arrangement data indicating a relative physical configuration of the device and the one or more neighbor devices with respect to one another;
access geometric data indicative of one or more physical dimensions of the device and one or more physical dimensions of the one or more neighbor devices; and
generate, using the arrangement data and the geometric data, relative spatial coordinates indicative of a location of the one or more sockets with respect to a designated origin of the array of the devices.

12. The device of claim 11, the first hardware processor further configured to execute the computer-executable instructions to:
provide, using the communication interface, the relative spatial coordinates to the one or more modular devices, wherein the one or more modular devices are configured to emit a signal comprising data based at least in part on the relative spatial coordinates.

13. The device of claim 4, further comprising:
data transmission media comprising one or more of an electrical conductor or optical waveguide; and
wherein the communication interface uses the data transmission media to establish communication between the device and at least a portion of the one or more neighbor devices.

14. A method comprising:
accessing digest data generated from a plurality of modular sections coupled together to form an array, the digest data comprising one or more of:
a section identifier that identifies a modular section that generated particular digest data;
one or more neighbor identifiers, wherein each neighbor identifier identifies a neighbor device coupled to the modular section that generated the particular digest data;
for each of the one or more neighbor identifiers, a position indicator that designates a position of the neighbor device with respect to the modular section that generated the digest data;
for the each of the one or more neighbor identifiers, a section interface identifier that designates a particular section interface to which the neighbor device is coupled to;
a device identifier that identifies a modular device coupled to a socket; or a socket identifier that designates the socket to which the modular device is coupled to;
generating, using the digest data, arrangement data indicating a relative physical configuration of the plurality of modular sections with respect to one another;
accessing geometric data of the plurality of modular sections; and
generating, using the arrangement data and the geometric data, spatial coordinates indicative of a location of the modular device.

15. The method of claim 14, the accessing the geometric data comprising:
retrieving one or more first physical dimensions and first shape data associated with the modular section associated with the section identifier; and
retrieving one or more second physical dimensions and second shape data associated with the one or more neighbor identifiers.

16. The method of claim 14, the generating the arrangement data comprising:
for a first modular section, determining a first section identifier of the first modular section appears in the digest data as first neighbor identifier data of a second modular section;
for the second modular section, determining a second section identifier of the second modular section appears in the digest data as second neighbor identifier data of the first modular section;
for the first modular section, determining a first section interface used to connect to the second modular section;
determining a first position of the first section interface relative to the first modular section;
for the second modular section, determining a second section interface used to connect to the first modular section; and
determining a second position of the second section interface relative to the second modular section.

17. The method of claim 14, the generating the spatial coordinates comprising:
accessing the arrangement data;
accessing one or more physical dimensions and a shape for each of the plurality of modular sections;
generating a model of the plurality of modular sections using the arrangement data and the one or more physical dimensions and the shape;
determining placement, within the model, of the socket to which the modular device is coupled; and
calculating the spatial coordinates using the placement.

18. The method of claim 14, further comprising:
determining an offset vector between a designated origin of the spatial coordinates and a second origin, wherein the designated origin of the spatial coordinates and the second origin specify different locations in space; and
adding the offset vector to the spatial coordinates to generate second spatial coordinates.

19. The method of claim 14, further comprising:
providing the spatial coordinates to the modular section to which the modular device is coupled.

20. The method of claim 14, further comprising:
receiving sensor data from a plurality of modular devices coupled to a plurality of sockets;
accessing the spatial coordinates indicative of the location of each of the plurality of modular devices; and
determining a location of an object using the sensor data and the spatial coordinates.

\* \* \* \* \*